United States Patent
Gupta et al.

(10) Patent No.: US 11,315,175 B2
(45) Date of Patent: Apr. 26, 2022

(54) PREDICTING REAL ESTATE TENANT OCCUPANCY

(71) Applicant: THE BEEKIN COMPANY LIMITED, London (GB)

(72) Inventors: Vidur Gopesh Gupta, London (GB); Chao Tang, London (GB); Anthony Bellotti, London (GB)

(*) Notice: Subject to any disclaimer, the term of this patent is extended or adjusted under 35 U.S.C. 154(b) by 205 days.

(21) Appl. No.: 16/719,338

(22) Filed: Dec. 18, 2019

(65) Prior Publication Data
US 2020/0334744 A1    Oct. 22, 2020

Related U.S. Application Data

(60) Provisional application No. 62/786,241, filed on Dec. 28, 2018.

(51) Int. Cl.
*G06Q 30/06* (2012.01)
*G06Q 50/16* (2012.01)

(52) U.S. Cl.
CPC ......... *G06Q 30/0645* (2013.01); *G06Q 50/16* (2013.01)

(58) Field of Classification Search
CPC .......................... G06Q 50/16; G06Q 30/0645
USPC ....................................................... 705/307
See application file for complete search history.

(56) References Cited

U.S. PATENT DOCUMENTS

| | | | |
|---|---|---|---|
| 2014/0257924 A1* | 9/2014 | Xie | G06Q 30/0202 705/7.31 |
| 2015/0095212 A1* | 4/2015 | Openlander | G06Q 40/025 705/38 |
| 2015/0199754 A1* | 7/2015 | Greystoke | G06Q 30/0645 705/307 |

(Continued)

FOREIGN PATENT DOCUMENTS

| | | | | |
|---|---|---|---|---|
| BE | 1023103 | * | 11/2016 | G06Q 50/16 |
| WO | WO-2018090788 A1 | * | 5/2018 | G06Q 30/06 |

OTHER PUBLICATIONS

Conformal Prediction for Reliable Machine Learning, ISBN: 978-0-12-398537-8, Published Apr. 2014, By Vineeth Balasubramanian, Shen-Shyang Ho, Vladimir Vovk, (Year: 2014).*

(Continued)

*Primary Examiner* — Richard W. Crandall
(74) *Attorney, Agent, or Firm* — Dorsey & Whitney LLP—Denver

(57) ABSTRACT

A system may include a rental unit allocation portal and a prediction unit. The portal receives tenant application information and allocating a rental unit based on the tenant application information and a length of stay prediction score associated with the tenant. The prediction unit may determine the length of stay prediction score by using one or more models and voting among the prediction scores of the one or more models. The one or more models may include a logic regression model, a survival analysis model, a tree-based model and/or a gradient boosting model. In addition, the system may include a conformal predictor (Continued)

configured to predict the confidence interval. The length of stay prediction score can also be provided to a risk allocation unit configured to quantify risk by aggregating it for a portfolio of underlying properties with tenants, or a portfolio of loans secured by tenanted properties.

20 Claims, 22 Drawing Sheets

(56) References Cited

U.S. PATENT DOCUMENTS

2017/0140458 A1* 5/2017 Mallach ............. G06Q 30/0645
2018/0060330 A1* 3/2018 Clinton ............. G06F 16/24578

OTHER PUBLICATIONS

Lopes et al., "Renthop: predicting interest level for rental listings," [online] published on Apr. 5, 2017, available at: < https://nycdatascience.com/blog/student-works/renthop-predicting-interest-level/ > (Year: 2017).*

* cited by examiner

|  | Jan | Feb | Mar | Apr | May | Jun | Jul | Aug | Sep | Oct | Nov | Dec |
|---|---|---|---|---|---|---|---|---|---|---|---|---|
| tenant 1 | G | G | G | G | G | G | G | G | G | G | G | G |
| tenant 2 | G | G | D |   |   |   |   |   |   |   |   |   |
| tenant 3 |   |   | G | G | G | G | G | D | G |   |   |   |
| tenant 4 | G | G | G | G | G | G | G | G | G |   |   |   |

FIG. 6

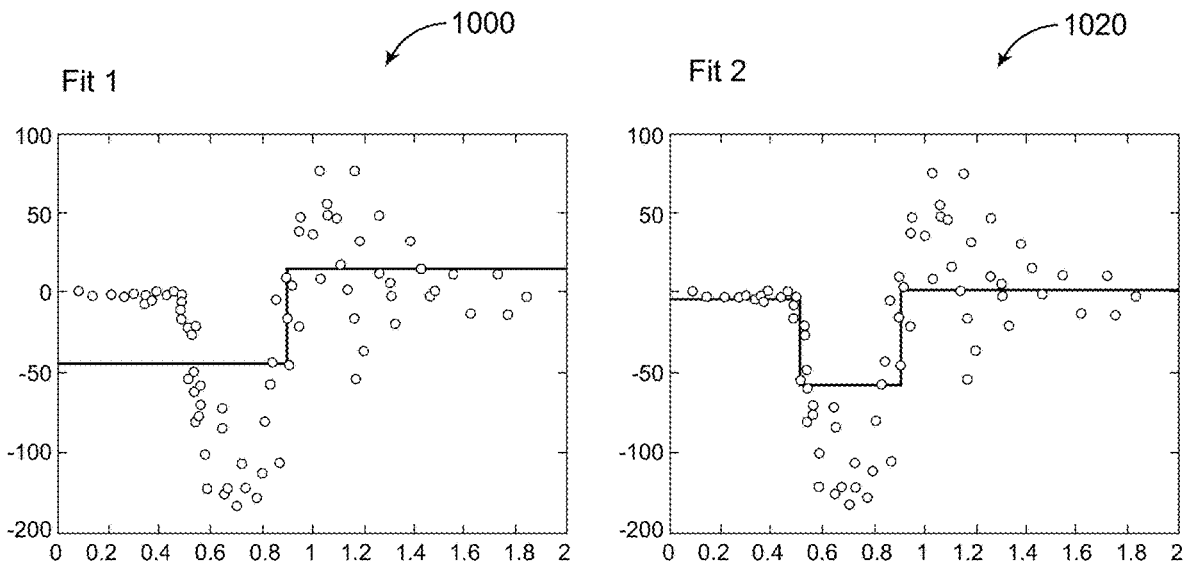
FIG. 10A
FIG. 10C
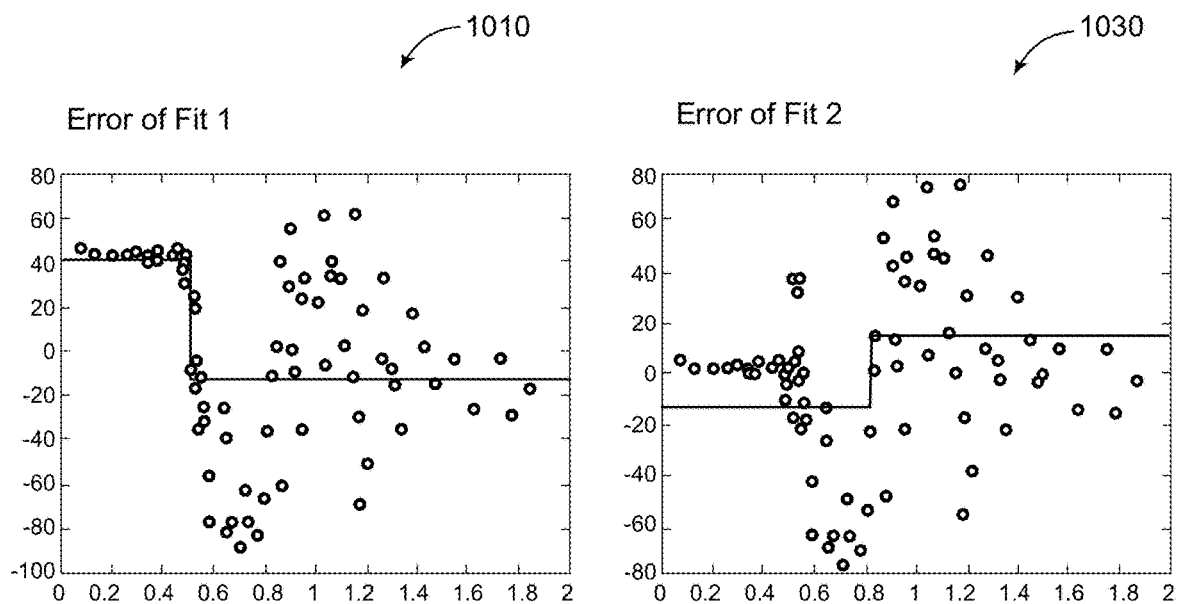
FIG. 10B
FIG. 10D

FIG. 18

PREDICTING REAL ESTATE TENANT OCCUPANCY

RELATED APPLICATION

This application claims the priority of U.S. Provisional Patent Application No. 62/786,241 entitled "Predicting Real Estate Tenant Occupancy," filed Dec. 28, 2018, which is incorporated herein by reference in entirety and for any/all purposes.

FIELD

This disclosure relates generally to systems and methods for predicting tenant occupancy length within a real estate unit. Examples of determining the probability of default, survival of a tenant, and/or expected duration of tenure in a specific rental unit are provided.

BACKGROUND

Landlords and other real estate managers typically must select a tenant for a particular unit (e.g., apartment, house, condo, townhome, etc.) for a particular length of time at a market-linked rent. Tenants often are chosen after an application and/or screening process and after selection typically will sign a lease or other rental agreement agreeing to pay a particular value (e.g., market-linked rent.) for a select period of time (e.g., month, year, etc.). Finding a tenant that will pay the desired value for the unit for the designated period of time is important to profitability for landlords and other real estate managers. Tenant defaults on rent, evictions, and vacancies reduce profit for a particular building, as well as cause headaches for the management. In addition, when tenants leave a certain apartment at the end of their scheduled tenancy, and do not renew their lease, landlords and other real estate managers suffer a loss of profitability owing to re-leasing the rental apartment to another prospective tenant, owing to lost rent in between tenancies.

Generally, landlords or management companies may conduct a credit check on applicants to help predict a particular tenant's ability to pay. A credit check generally determines an applicant's credit score, which can typically outputs a risk assessment based on a tenant's past payment history. However, these types of risk assessments while providing an indicator for some applicants, are not sufficient to determine overall suitability of a tenant nor duration of a tenant within a particular unit. As such, landlords, real estate managers, and lenders may generally face high rates of tenant defaults on rent, moving out, evictions, and the like, reducing profitability and increasing man-hours and stress.

BRIEF DESCRIPTION OF THE DRAWINGS

The present disclosure will be described with reference to the following figures, in which like numerals represent like items throughout the figures.

FIG. 5C illustrates a cumulative percentage of evictions filed per month from data examples. Month 0 means the eviction has been filed within 30 days from the date tenant moved in.

FIG. 6 illustrates an example format for survival data for a plurality of tenants.

FIG. 10A illustrates an example of an effect of Gradient Boosting showing fitting a simple model to the data.

FIG. 10B illustrate a fitting of a model to the errors of FIG. 10A.

FIG. 10C illustrates adjusting the model used for FIG. 10A.

FIG. 10D illustrates fitting the model used for FIG. 10A to the adjusted model's error.

FIG. 18 illustrates an example system according to various embodiments of the present disclosure.

DETAILED DESCRIPTION

Figure 1A:
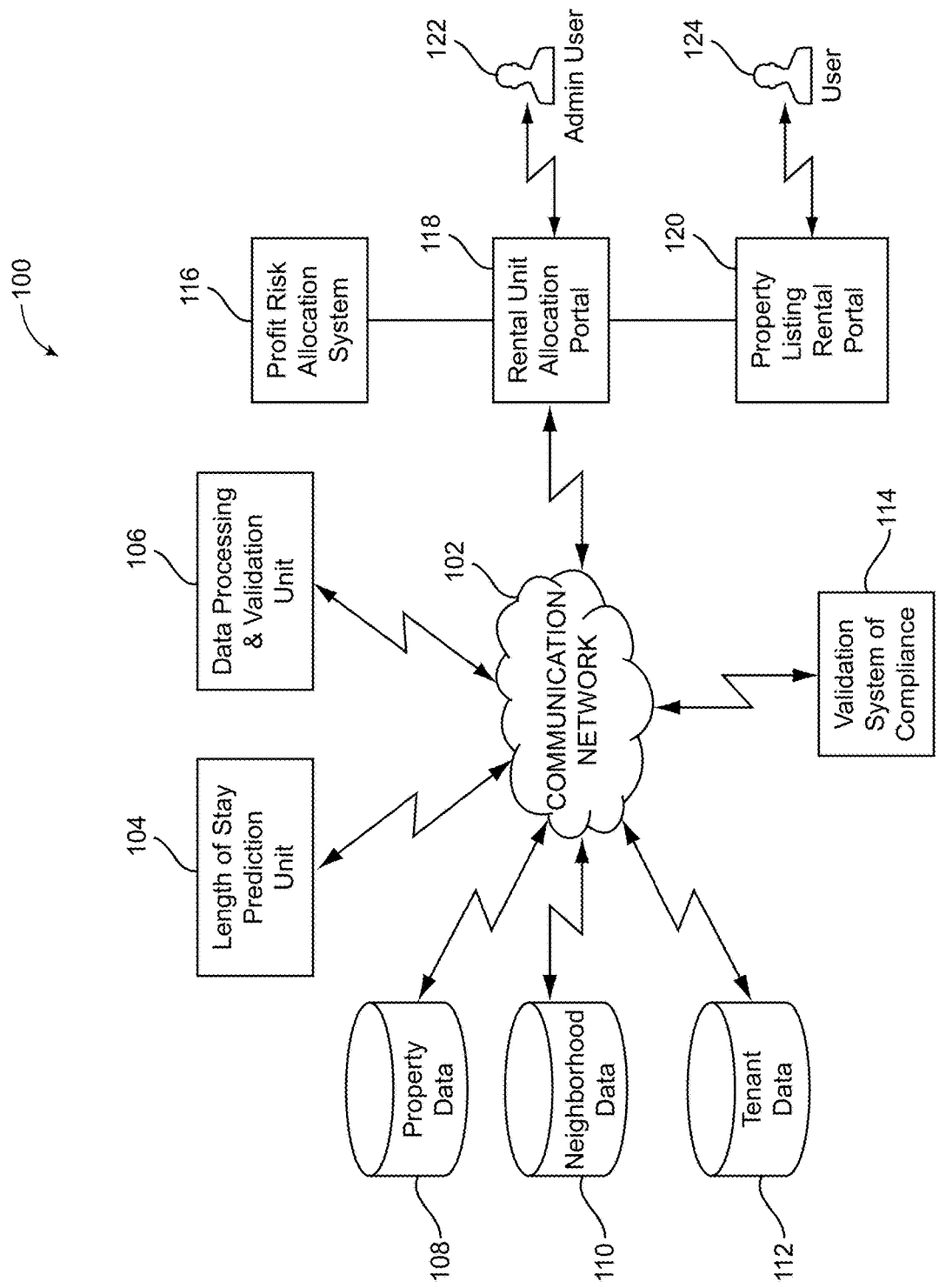
FIG. 1A illustrates an example system for analyzing and predicting tenant occupancy and suitability in accordance with various examples described herein.

Generally, the present disclosure is related to systems and methods to predict tenant occupancy length and/or likelihood of default or other stay-related event. The methods described herein may be implemented on various computing devices, such as servers, computers, distributed systems, or the like, and are configured to provide output information in the form of a graphical display, print out, alerts, or the like, to a user, e.g., as an application program interface for a user device. In some embodiments, the tenant occupancy methods and systems take into account a tenant's ability to pay a selected value for a unit, but also a tenant's willingness to pay, which can be leveraged by landlords, lenders, real estate managers, or the like, in selecting a suitable tenant for a particular real estate unit. In one example, a plurality of factors, including neighborhood factors (e.g., desirability, location, etc.), spatial or property specific reasons (e.g., size, features or amenities), credit information, social or online tenant activity (e.g., social media information, networking sites, etc.), and/or prior tenancy data, is input into an artificial intelligence driven model or other similar algorithmic assessment, such as a classification algorithm, survival mode assessment, and/or a random forest review, to output a particular score or rating for a tenant and/or a predicted time until the tenant moves or defaults on the property. In some embodiments, multiple models and approaches are used together and the combined assessment, such as through a voting analyzer or other balancing factor, optionally weighting a particular method, is then applied to output the predicted risk.

These methods and systems allow a user, such as a landlord or real estate manager, to have a prediction on the expected duration of stay of a particular tenant for an apartment, single family home, condo, or the like. By more comprehensively outlining a tenant's likely occupancy and payment likelihood, a user can better screen applicants for a particular property or unit and/or better predict performance for a portfolio of properties. Conventional systems relying solely on credit information cannot provide an accurate assessment for a particular tenant, resulting some applicants being selected that ultimately have a high risk of leaving (understay) or defaulting before the term and/or rejecting some applicants that may be ultimately a low risk for the same.

In some examples, the system may interact with a tenant to receive tenant information and then may retrieve additional information relevant to the tenant information, and use the tenant information and additional information to predict tenant occupancy length and/or likelihood of default, or whether the tenant has a risk. The system may use the prediction result to allocate a suitable rental unit to the tenant or a risk score for a portfolio of apartments. In predicting the tenant occupancy or the tenant risk, the system may use one or more machine learning models, such as a logic regression model, a survival analysis model, a tree-based model and/or a gradient boosting model.

As used herein, the term "default" event is referred to as positive and "not default" as negative. It can also be used to imply, staying less than 12 months in a specific rental apartment. A Confusion matrix is used to demonstrate the performance of the prediction (usually binary).

True Negative (TN): Prediction says Negative (0), and they are actually Negative.

True Positive (TP): Prediction says Positive (1), and they are actually Positive.

False Negative (FN): Prediction says Negative, but they are actually Positive.

False Positive (FP): Prediction says Positive, but they are actually Negative.

In an example of a confusion matrix for 2 classes below:

|  | Predict Negative (0) | Predict Positive (1) |
| --- | --- | --- |
| Actual Negative (0) | 100 (TN) | 40 (FN) |
| Actual Positive (1) | 39 (FP) | 250 (TP) |

Three quantities may be defined below as the common measures for comparing and testing the fit of the model and they will be constantly referred to during the following sections. Accuracy=(TP+TN)/(TP+TN+FP+FN). Sensitivity=TP/(TP+FN). Specificity=TN/(TN+FP).

"Accuracy" may include a measure of how many individuals have been classified correctly to either Positive or Negative. "Sensitivity" may include a measure of how much the prediction correctly classified those who have defaulted or left. (TP rate). "Specificity" may include a measure of how much the prediction correctly classified those individual didn't default (TN rate). In some examples, all 3 quantities are a percentage expressed which should be as a number in [0, 1].

The ROC curve (Receiver Operating Characteristic) is used for measuring the goodness of fit for the binary classification model defined earlier. The curve illustrates the diagnostic ability of a binary classification model as the threshold of predicting classes is varied. The y-axis values are the Sensitivity or the TP rate, and the x-axis values are the FP rate or (1-Specificity), the shape itself shows the trade-off between the TP and FP rates. If the curve is very close to y-axis it means that the model is predicting nearly every Positive entry correctly, similarly if the right hand side of the curve is close to the top horizontal line where Sensitivity=1 then the model is correctly finding all data points that are actually in the Negative class. The perfect fit is achieved by making every prediction with no error (FN=FP=0).

Figure 2:
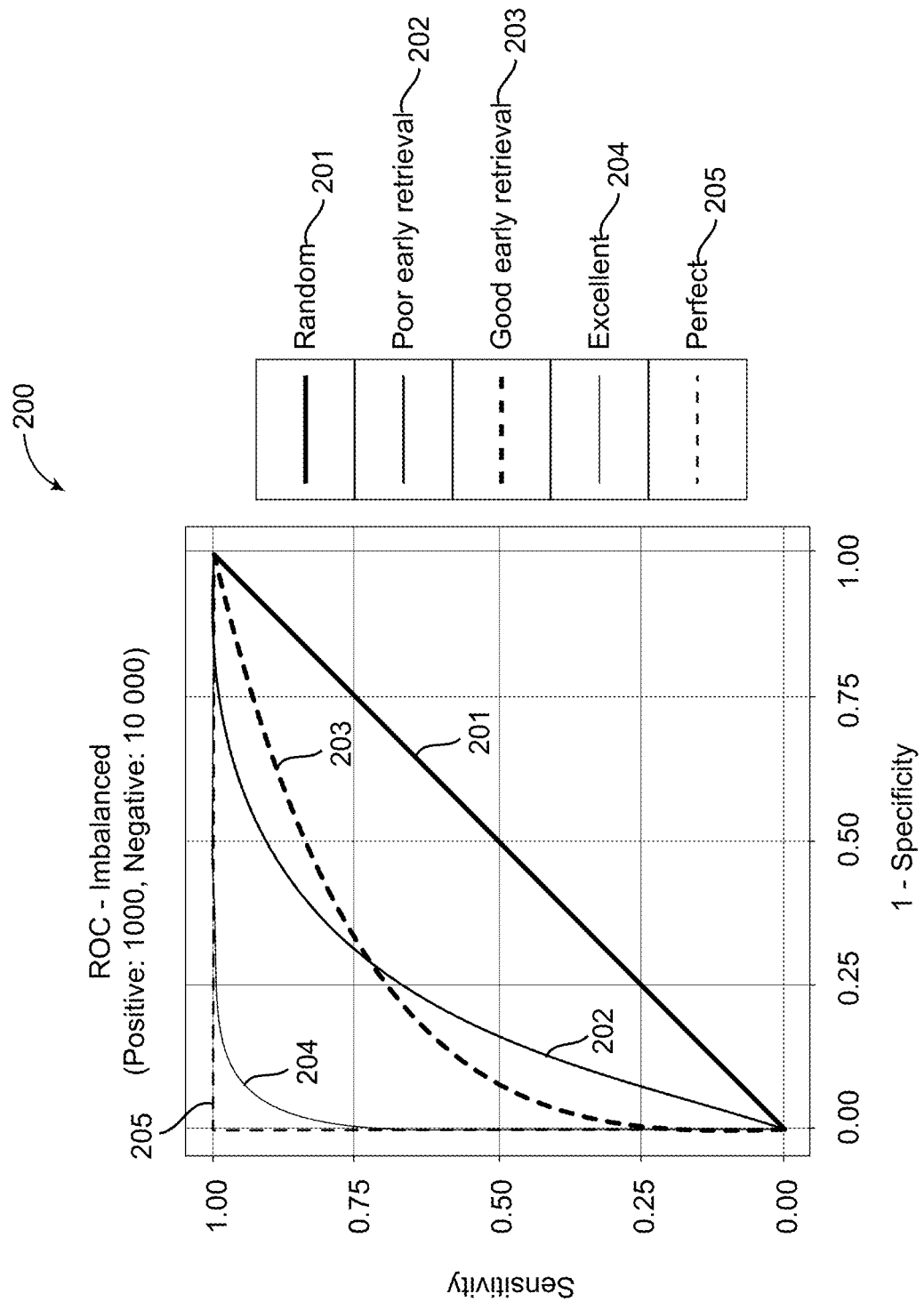
FIG. 2 illustrates an example of different shapes of ROC curves.

One measure to distinguish between two ROC curves is the area under the ROC curve, abbreviated AUC. The ROC curve is constrained inside a unit square so the maximum value for AUC is 1 and for a properly defined classifier the minimum AUC should be greater than 0.5 (since 0.5 is a random classifier). In some examples, the AUC may be calculated using a trapezoidal rule with the function ROC ( ) such as what is being calculated in R package "pROC". One thing to be noted is that it is not unusual for a greater value AUC classifier to perform worse than a smaller AUC classifier at a particularly high or low cut-off point: as seen in FIG. 2, the green ROC curve performs better than the blue curve at a low threshold, but worse than the blue curve in the higher threshold.

In hypothesis testing, probability or p-values are frequently used. They denote the significance of the results, i.e. whether to reject or not reject the hypothesis under study. The lower the p-value, the greater the significance. Depending on the sample size, a p-value of 0.05 may or may not be considered significant, but in this report 0.05 has been used. The procedure of hypothesis testing with a significance level equal to 0.05 is the following:

A small p-value (<0.05) indicates strong evidence against the null hypothesis so the null hypothesis is rejected and the alternative idea is accepted.

A large p-value (>0.05) indicates that there is not enough evidence to invalidate the null hypothesis, so the null hypothesis is not rejected based on these data.

The Delong test was mainly used for testing the significant difference using a pair of AUC values. The R function used to test the significance is roc.test(x,y) with the default method being the Delong test for paired ROC curves, where x and y are roc class objects. The null hypothesis is that there is no difference between two AUCs, x and y, while the alternative hypothesis is that the true difference in the AUCs of x and y is not equal to 0.

With reference to FIG. 1A, a system for predicting tenant occupancy and/or tenant risk, e.g., system 100, may include various data in a communication system. For example, the data may include property data 108, neighborhood data 110, tenant data 112, and the like. For example, property data may include data specific to the property, including the property itself and apartment attributes, such as parking and amenities. Neighborhood data may include data about the neighborhood, such as school, crime rate, median income etc. Tenant data may include data about the tenant, such as credit score, measure of liabilities.

The system 100 may also include length of stay prediction unit 104 configured to predict the length of stay for a given tenant based on the various data 108, 110 and 112. The system 100 may also include data processing and validation unit 106. For example, data processing and validation unit may retrieve at least a portion of the data 108, 110 and 112, validate the retrieved data and/or process the data to extract certain features. The system 100 may further include validation system of compliance 114. The system 100 may also include a rental unit allocation portal 118. For example, the rental unit allocation portal may be configured to interact with an administrative user 122, and allocate certain unit to a given tenant (or prospective tenant).

In a non-limiting example, the rental unit allocation portal 118 may be a website portal that is installed on a server on the communication network 102. The portal 118 may include a back-end database engine configured to retrieve data from the communication work, such as property data 108, neighborhood data 110 and tenant data 112. In some examples, the portal 118 may include a user interface, such as a website page displayable on a display of a user device. In some examples, a portal may include a processing device and an application executable on the processing device. The application may have a user interface. The user interface of the portal 108 may facilitate a user, e.g., a leasing agent, to interact with the portal 118. For example, the user may enter tenant data 112 (or prospective tenant) information, application data, intended stay, income and credit information, rental history etc. In some examples, some of those information may be obtained through the database engine, which may be configured to use user entered information to interrogate the various data available on the communication work 102 and retrieve other related information. For example, the portal 108 may receive the social security number of the tenant from the user, and use that number to retrieve other credit information and rental history of the tenant.

In some examples, the rental unit allocation portal 118 may be coupled to a portfolio risk allocation system 116 that can be used for portfolios of rental apartments or loans secured against such apartments, and property listing rental portal 120. For example, the property listing rental portal 120 may be configured to interact with a prospective tenant. The prospective tenant 124 may fill out a rental application through the property listing rental portal 120 and also upload required tenant information. Various aforementioned units and system may be configured to communicate with each other via the communication network 102. The communication network 102 may be operating using wired (e.g., Ethernet) or wireless communication protocols (e.g., Wi-Fi, Bluetooth, ZigBee), or other communication protocols now or later developed.

In some examples, once tenant application is uploaded to the system, the system may cause the length of stay prediction unit 104 to determine the prospective tenant's length of stay. The system may also cause the portfolio risk allocation system 116 to determine the risk associated with the prospective tenant or a portfolio of rented apartments. For example, the risk may include a potential risk of being evicted for nonpayment. Based on the result of the prospective tenant's length of stay, the system may cause the rental unit 118 to allocate a suitable rental unit to the tenant. The length of stay prediction unit 104 may also use conformal predictors to provide a confidence interval for a proposed length of stay score, indicating a confidence band within which such a predicted score may lie, which allows for quantifying the uncertainty inherency in making predictions. For example, data set will be first divided into a training, a calibration and a test set. Then the system, e.g., rental unit allocation portal 118, may train a machine learning method aimed at predicting length of stay on the training set. This procedure yields a point estimate for length of stay. The calibration set is then used to arrive at a predictive interval by quantifying the similarity between the predicted length of stay value and the target variables of the calibration set.

Figure 1B:
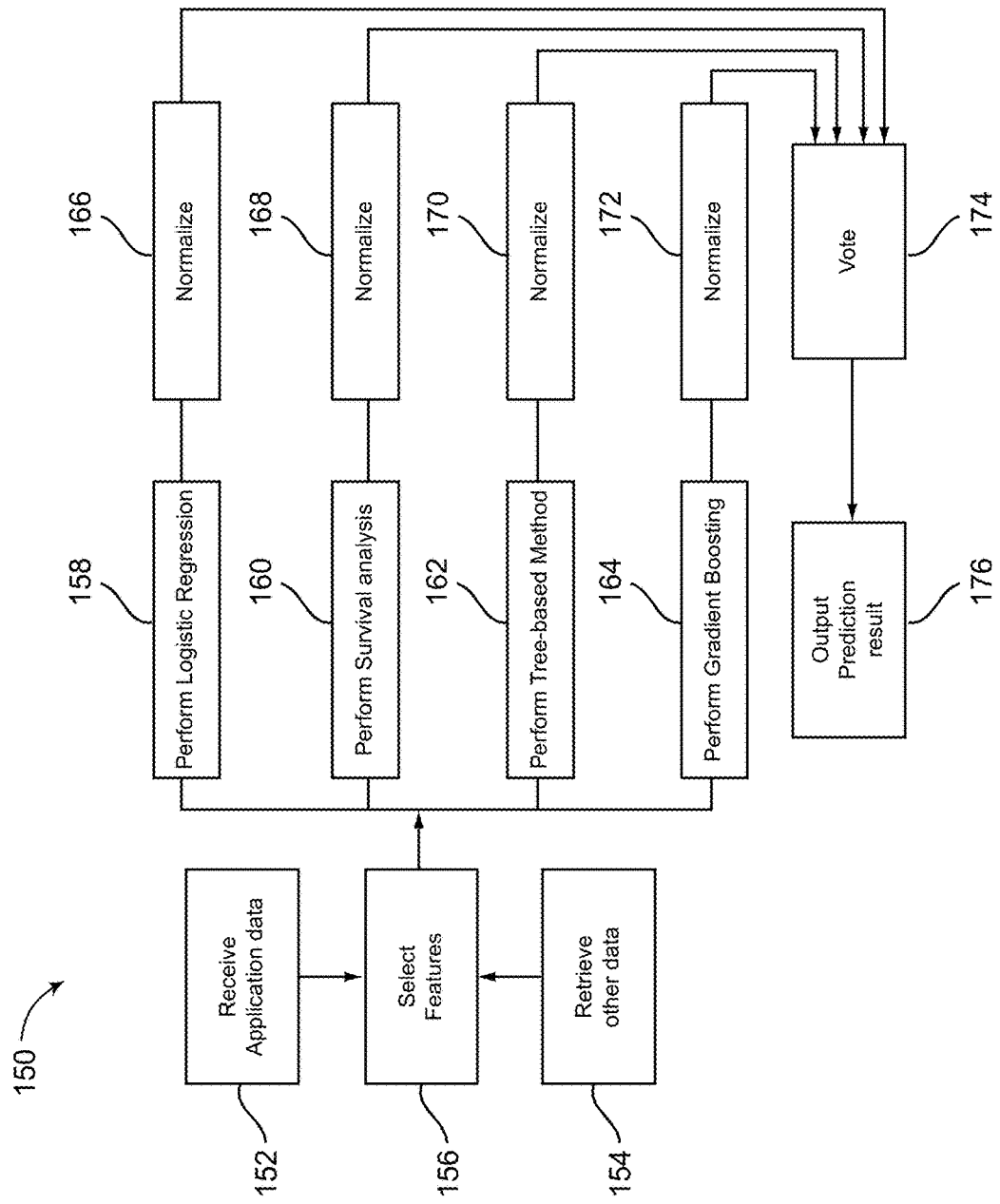
FIG. 1B illustrates a diagram of a process for assessing tenant suitability and occupancy according to various examples described herein.

With reference to FIG. 1B, a process that may be implemented in the length of stay prediction unit 104, is described. A process 150 may include receiving application data at 152 and retrieving other data at 154. For example, process 152 may receive tenant application data from the property listing rental portal (e.g., 120 in FIG. 1A) via the communication network 102. Process 154 may also retrieve other types of data (e.g., 108, 110, 112 in FIG. 1A) via the communication network 102 or via a direct connection, such as accessing data from one or more memory locations or other storage. Process 150 may further include selecting features at 156 from the various data (e.g., 108, 110, 112 in FIG. 1A), which will be used by various machine learning models.

In some examples, the process 150 may include performing one or more machine learning tasks, such as performing logistic regression over the selected features at 158, performing survival analysis at 160, performing tree-based methods at 162, and/or performing gradient boosting at 164. In some examples, the processes 158, 160, 162 and 164 may each include a training process configured to receive training data to obtain a respective model. These various machine learning process may generate various scores given the tenant information entered from the portal 108. For example, based on tenant information and other data, process 158 may generate a probability of default for the prospective tenant. Process 160 may generate a survival probability of the prospective tenant. Process 162 may generate a risk measure for the prospective tenant. Process 164 may generate a hazard scale associated with the prospective tenant. These processes will be further explained in detail.

In some examples, the system may additionally include normalising the results of the processes 158, 160, 162 and 164. For example, process 150 may include quantizing the result from process 158 at normalisation step 166. Process 150 may also include processes 168, 170 and 172, which normalises the results of respective processes 160, 162 and 164. Additionally, the system may include a voting process 174, which selects the results from one or more of the processes 158, 160, 162 and 164. In a non-limiting example, the results from process 166, 168, 170 and 172 may each indicate whether the prospective tenant may have a likelihood of going into default during the tenancy period or a specified length of stay score, e.g., tenants with a likelihood of staying beyond a period, e.g., 12 months.

In some examples, the length of stay prediction score can also be provided to the portfolio risk allocation system, such as 116 in FIG. 1, which is able to quantify risk by aggregating it for a portfolio of underlying properties with tenants, or a portfolio of loans secured by tenanted properties as well. For example, after the risks are being quantified, the result of the various models may include a risk score as to whether the tenant may have a risk of understay or being evicted. In some examples, if the answers to a risk of understay or eviction are positive for one or more of the processes 166, 168, 170 and 172, then the process 174 may determine that the prospective tenant may have a risk of being evicted. The voting process 174 may vary as to how many processes (among 158, 160, 162 and 164) are combined and how. For example, the voting process 174 may use weights for different processes such that a score from one of the processes 158, 160, 162 and 164 may weigh more than the score from another. For example, a risk measure generated by the survival analysis in 160 may be weighted more heavily than a hazard scale generated from the gradient boosting in 164. In a non-limiting example, if regulations such as the Fair Housing Act are in compliance, the weight on logic regression may be higher than that of other models.

The process 150 may further include outputting the prediction result from the voting process 174 at 176. In some examples, the prediction result may include a risk output which may be provided as a score. In some examples, the risk output may also be provided with a confidence interval provided for the estimate. In addition, the system (e.g., 100 in FIG. 1) may facilitate the user, e.g., a landlord or a lender, to benchmark their own scores against the average score of other renters in the area, and/or score for other landlords who share data with the system, and perform analytics over the score.

Figure 1C:
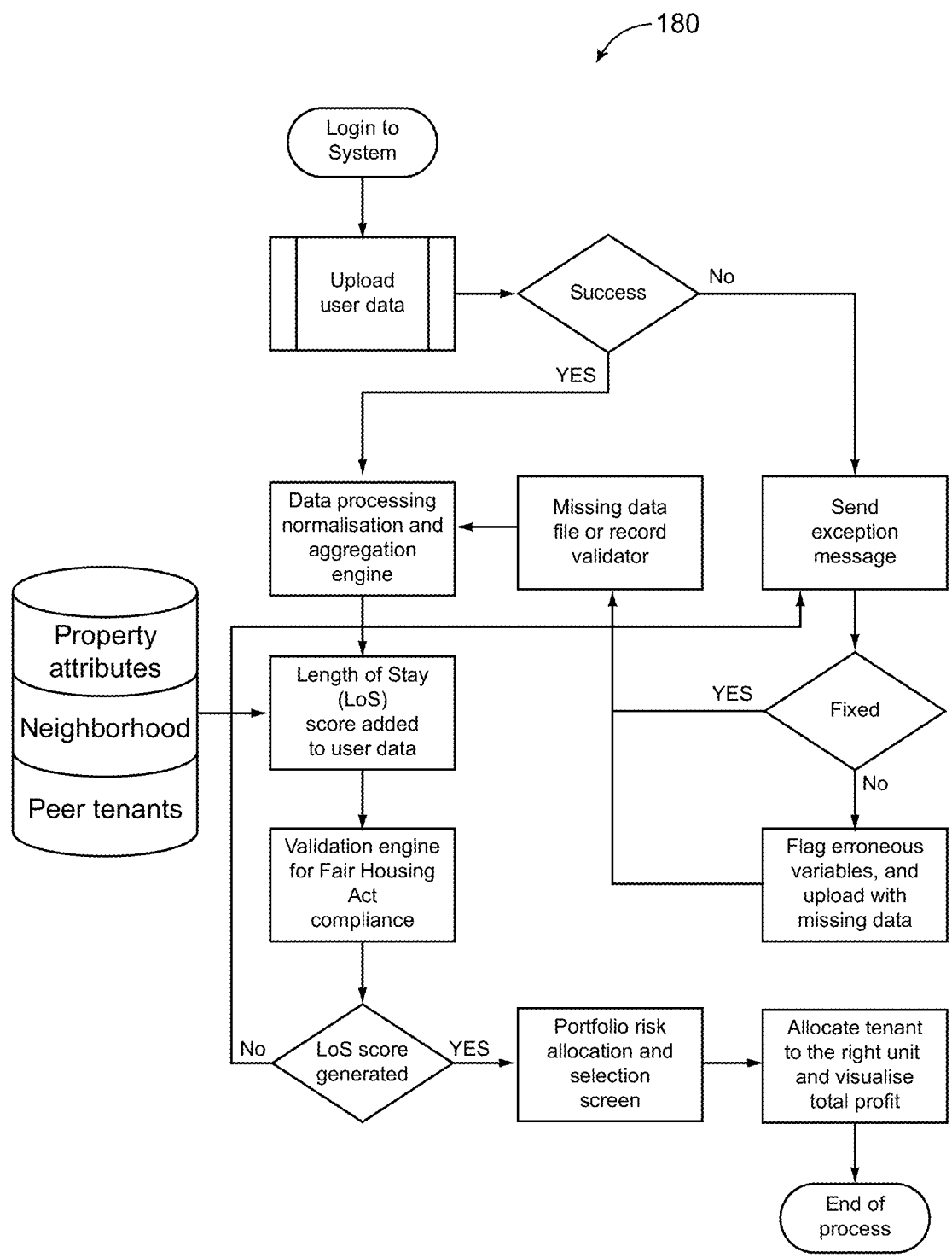
FIG. 1C illustrates a diagram of an example process implemented in the system of FIG. 1A in accordance with various examples described herein.
Figure 1D:
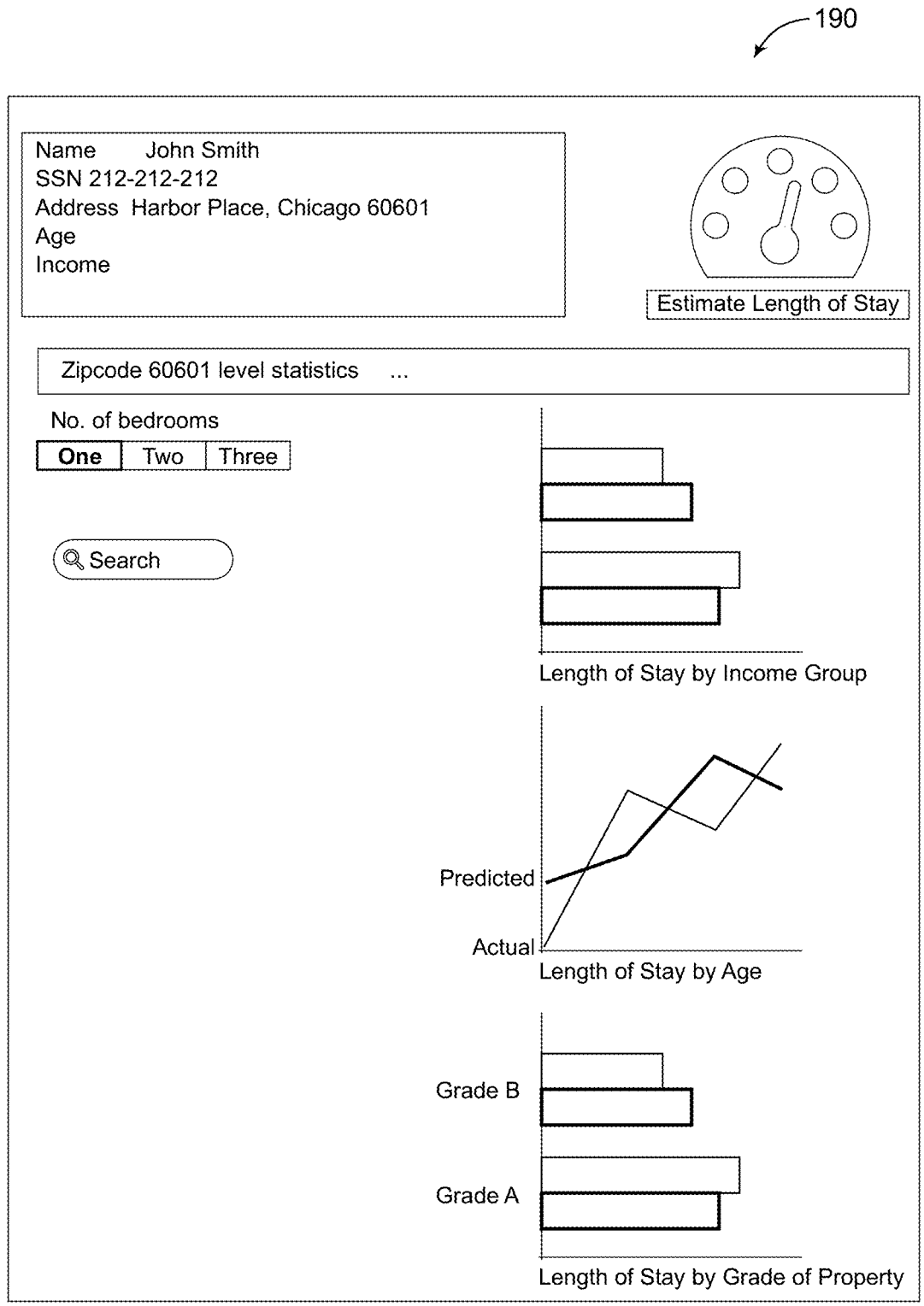
FIG. 1D illustrates a screenshot as an example output that can be provided to a user regarding a tenant's predicted length of stay in accordance with various examples described herein.

For example, the prediction result may be transmitted to the rental unit allocation portal 118, which may allocate a proper unit for the prospective tenant. The rental unit allocation portal 118 may also determine to not allocate any rental property, or reduce the duration of the tenancy, to reduce the risk of loss for the landlord. FIG. 1C further illustrates an example process that may be implemented in a system, such as FIG. 1A. FIG. 1D illustrates a screenshot as an example output that can be provided to a user regarding a tenant's predicted length of stay. For example, the screenshot may be provided in a user interface of the portal 118.

In some examples, data (such as 108, 110, 112 in FIG. 1A) may be received in various formats. For example, data may be in Excel workbook format. These include tenant data, property data and payment data, all of which can be mapped to unique tenant IDs and property IDs. In an example system, data contains 14,598 data points. The earliest date that is recorded in the dataset is May 5, 2017 and the latest date is Jan. 8, 2018. In this data set, only 23% (3216 applicants) became tenants, so the analysis will be only dealing with these 3216 tenants because the remaining data had no tenancy outcome since they were rejected by the landlord. Table 1 and Table 2 on the next page shows a summary of the data set, the details of each variable and definition tables are included in the present disclosure.

TABLE 1

| Payment data summary | | |
|---|---|---|
| Tenant Variables | Property Variables | Payment Data |
| 20 features | 21 features | 6 time series |
| Time series | Description | |
| paid in 15 | Rent is paid within 15 days after it is due | |
| paid in 30 | Rent is paid within 30 days after it is due | |
| paid in 45 | Rent is paid within 45 days after it is due | |
| paid in 60 | Rent is paid within 60 days after it is due | |
| Expected Payment | Expected rent to be paid | |
| Total paid | Total rent has been paid (including payment that's after the court) | |

TABLE 2

New variable created for further analysis.

| Variables | Type of variable | Description |
|---|---|---|
| state1 1.0 | Binary | Indicator of tenant enters State 1 |
| state1 1.0 month | Numeric | The month which tenant entered State 1 |
| state2 1.0 | Binary | Indicator of tenant enters State 2 |
| Duration | Numeric | Number of rent payments tenant need to make |
| missing FICO | Binary | Indicator of missing the FICO data |
| missing income | Binary | Indicator of missing the monthly income data |
| missing rent | Binary | Indicator of missing the rent price data |
| missing history | Binary | Indicator of those tenants who were rejected but become a tenant |
| Eviction month | Numeric | If Eviction is filed: Number of months in between Move.In.Date and Eviction.Filed.Date. If Eviction is not filed yet: Number of months in between Move.In.Date and date the data is sent (June 2018) |

Note:
1.0 in the variable name means the relaxation parameter a = 1.0. State 1 and 2 will be defined.

As used below:

$_iA^j$=Actual rent payment at month i within j days, $E^i$=Expected rent payment for month i, a=Relaxation parameter, i∈{1, ..., 12}, j∈{30, 60}, a∈{0.1, ... 0.9, 1}.

The relaxation parameter α is set for relaxing the condition of entering States 1 and 2. For example, if α=0.5, that means for a tenant to enter State 1 or 2 he/she needs to miss more than 50% of the expected rent payment for the month. The following states defined below were once considered as the response variable.

State 1 condition:

$$A_{30}^i < aE^i \text{ and } (A_{60}^i + A_{30}^{i+1}) < \alpha(E^i + E^{i+1}).$$

State 2 condition:

$$A_{30}^i < \alpha E^i \text{ and } (A_{60}^i + A_{30}^{i+1} + A_{30}^{i+2}) < \alpha(E^i + E^{i+1} + E^{i+2}).$$

Eligible for filing for eviction in state IL (Chicago) condition:

$$A_{30}^i < (0.3)E^i \text{ or } E^i - A_{30}^i \in \{200, \ldots, 300\}$$

Figure 3:
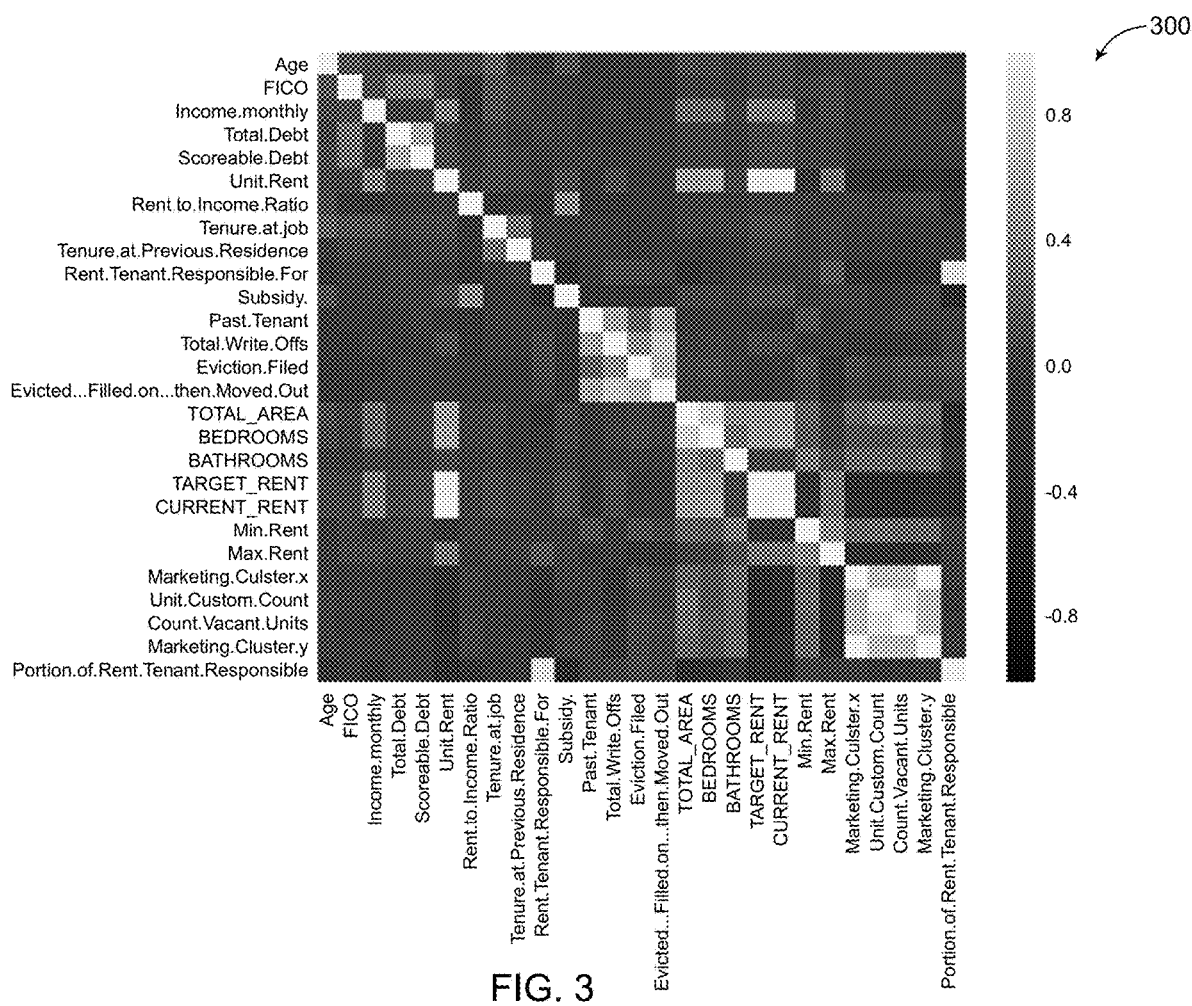
FIG. 3 illustrates an example of a correlation matrix in heat map form of numerical and binary variables in data set, with white demonstrating a high correlation and darker colors illustrate lower correlations.

Correlation (Pearson's correlation) is very easy to interpret and widely used in statistics. It summarises the linear relation between two numerical variables in a number between [4,1] where 1 means a perfect positive linear relation, −1 means a perfect negative linear relation and 0 means no relation at all. Hence begin with the analysis by looking at the correlations between variables, as standard procedure. By inspecting FIG. 3, looking at the hot (white) areas, TARGET RENT, CURRENT RENT and Unit.Rent are positively and highly correlated since those values are strongly linked to each other. The features Total.Write.Offs, Past.Tenant and Eviction.Filed (response vari-ables) are also quite correlated to each other. The definitions of Marketing.Cluster.x, Unit.Custom.Count, Count.Vacant.Units and Marketing.Cluster.y were also correlated (bottom right corner of FIG. 3).

The correlation diagnostic will become the basis of the Feature Selection to be described later in the present disclosure. The two variables Marketing.Cluster.y and Marketing.Cluster.x were created by the discrepancy from merging the property features (features of the house) and unit features (features of the room) which again show an inconsistency with the data set. The correlation will be applied to analyse the similarity of the ranking in different types of scores described later.

There were many variables which were removed because of the enormous amount of missing data, i.e. more than 50% or completely empty. The cause of these missing data is assumed to be a deficiency in the data recording process or else a mapping inconsistency between data frames; for example, many tenants' move out date cannot be recorded accurately without tenants informing the landlord.

BUILDING AMENITY is a string of features about building, for example whether this property has internet. The word search has been employed to create some new features such as "Internet included", "Fitness centre" etc. The column ADDRESS will not be used for the analysis, one may say the keyword search could provide us with the useful information but in fact, it will just repeat the same information given from the City or Neighbourhood variable. Similarly, the ZIP CODE will just repeat the information given by City and Neighbourhood hence it is not included.

Some features such as FICO and income monthly also suffered from missing or, rather, incorrectly recorded data. For example, FICO has been recorded as 1 indicating the FICO score is not available; normally FICO is a 3-digit number ranging between 579-800. In this case, FICO=1 has been coded as "not available" hence imputation or deletion is required. Since the sample size is already considerably small, the natural choice is imputation, replacing the missing data with the existing data's average.

TABLE 3

Table of the missing values and the value replaces the missing values.

| Variables | Number of missing values | Value imputed |
|---|---|---|
| FICO | 328 | 549.27 |
| Monthly income | 105 | 2392.45 |

Figure 4:
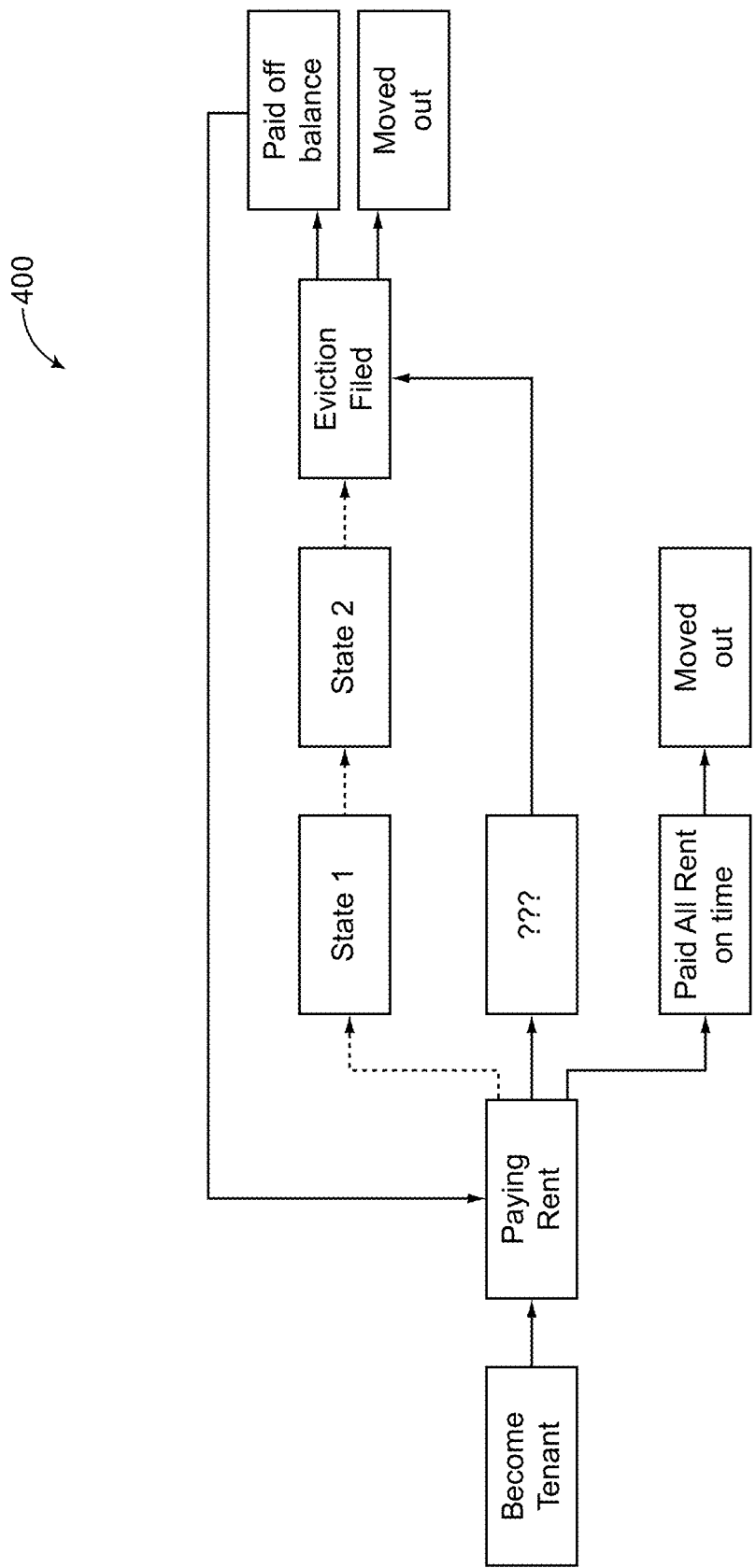
FIG. 4 illustrates a road map of tenants occupancy depending on rental payment. Dash lines indicates indefinite implications and solid line means definite implication. Misc. criteria encompasses unknown criteria for filing an eviction.

A landlord user may want to identify risky tenants as soon as possible. FIG. 4 illustrates a road map of tenants depend on their action of rental payment. Dash line indicates indefinite implications and solid line means definite implication. Misc. Criteria accounts for unknown criteria for filing the Eviction, this route has been assumed throughout the report.

TABLE 4

Percentage of different potential response variables.

| Eviction filed (within 1 year) | Eviction filed (anytime) | Evicted? (Filed on, then Moved Out) | Eviction filed, paid balance | State 1 | State 2 |
|---|---|---|---|---|---|
| 19.4% | 20.1% | 3.9% | 3.7% | 69.6% | 50.6% |

States 1 and 2 happen prior to other Eviction filing processes, as FIG. 4 shows; these are the earliest stages where landlord starts to lose money hence in an ideal situation these events should be prevented by forecasting. However, if States 1 and 2 are irrelevant or weakly linked to the ultimate default then they would not be considered as a response variable any more. From Table 4, one can tell that some data is class imbalanced, with only 3.9% of the sample who default in one common definition, and 19.4% of the sample entered the 'Eviction filed' stage which happens prior to default. On the other hand, it is more common for tenants to enter State 1 and 2 than to undergo Eviction; this implies that at State 2, the Eviction filings are not immediate and unavoidable.

There are a significantly large number of tenants not being filed for eviction when clearly the default condition, State 2, has been reached. The possible explanation for this phenomenon could be because: the eviction process has not been carried out strictly enough; human error or some unknown procedure hidden in the eviction process which has not been disclosed. This unknown condition or state is symbolised as "???" in FIG. 4.

TABLE 5

Tables of confusion matrices treating State 1 and 2 as Prediction and Eviction as Actual, showing many tenants have entered States 1 and 2 but were designated "Eviction not filed".

|  | Not in State 1 | In State 1 |
|---|---|---|
| Eviction not filed | 926 | 1777 |
| Eviction filed | 39 | 472 |

|  | Not in State 2 | In State 2 |
|---|---|---|
| Eviction not filed | 928 | 1785 |
| Eviction filed | 39 | 476 |

TABLE 6

Numbers of misclassifications for tenants who have fulfilled the eligibility condition for filing for eviction (Chicago).

|  | Eligible for Eviction ($200-300 or 30% missing) | |
|---|---|---|
| Eviction Filed | 0 | 1 |
| 0 | 1038 | 343 |
| 1 | 3 | 79 |

In an example, in Chicago (Ill.) the condition for filing for an eviction is when the tenant has outstanding rent of between $200-300 or has paid less than 30% of the monthly rent to the landlord. However, even with this very specific criterion provided by the landlord, one can see in Table 6 that 23% of tenants are eligible for filing for eviction but no filing has actually occurred.

Figure 5A:
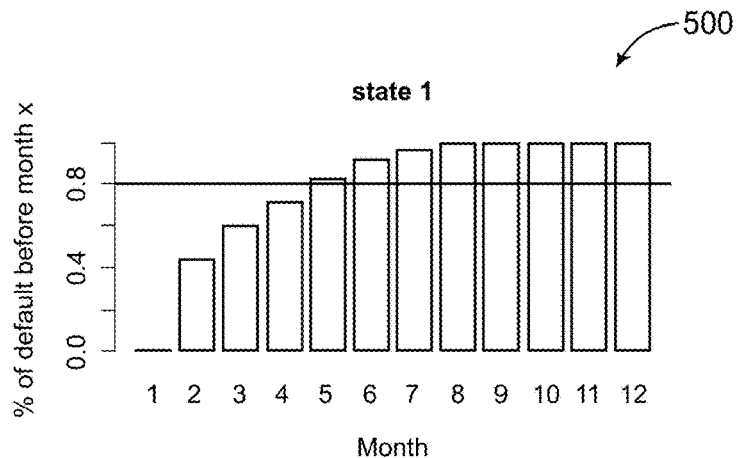
FIG. 5A illustrates a cumulative percentage of State 1 in FIG. 4. The horizontal line marked the 0.8 point for judging at which month the majority of adverse events occur.
Figure 5B:
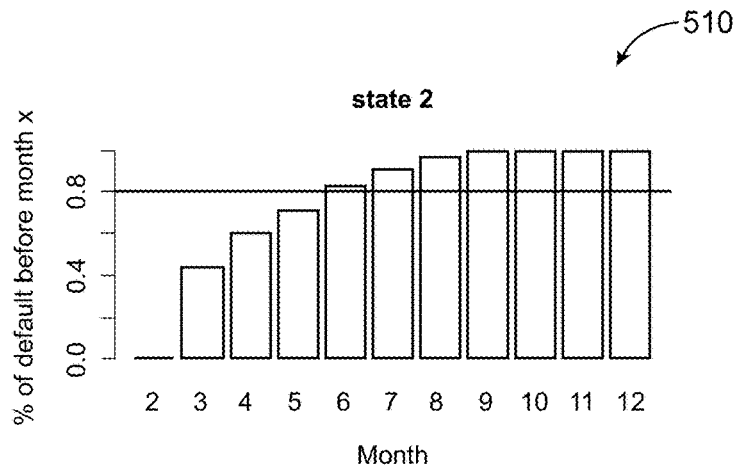
FIG. 5B illustrates a cumulative percentage of State 2 in FIG. 4, with the horizontal line marked at an example point at 0.8 for judging at which month the majority of adverse events occur.
Figure 5C:
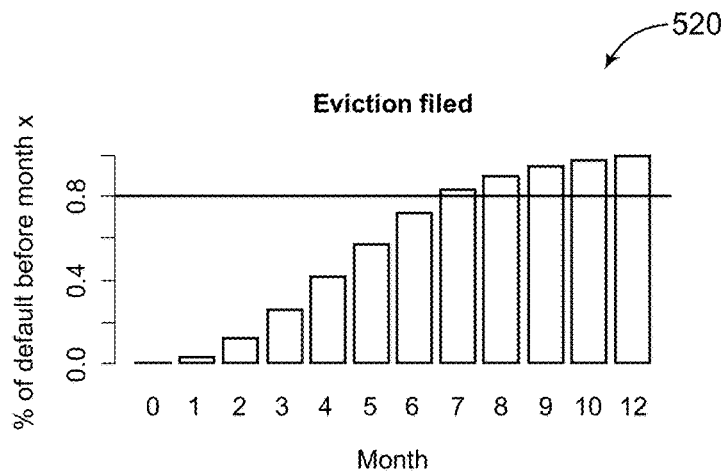

FIGS. 5A-5C show the cumulative percentage of State 1, State 2 and 'Eviction filed' with increasing numbers of months in residence. Month 0 means the eviction has been filed within 30 days from the date tenant moved in. In addition, for non-evicted tenant population, this is similar for tenants staying longer than, for example, 12 months in an apartment (e.g., average tenure of tenants in Dallas Fort Worth area), classified as "good" tenants. The shape difference shows even more indicatively that State 1 and 2 were very weak indicators of an actual Eviction process, therefore they will no longer be considered as the response variable.

Eviction within less than 12 months may also be considered as a critical response variable since tenants were less likely to default in later stages of their tenancies. FIG. 5 shows that out of those on whom eviction was filed, not many filings occurred before month 7. From a business point of view, regarding how the landlord operates, if the tenant defaults within a 12-month tenancy, the landlord would lose money regardless of whether the Eviction process has been filed or not. Therefore, to minimise losses, the ideal situation would be to approve applicants who were predicted never to default within the contract period (usually 1 year).

In some examples, event of default (or failure) may be defined as an Eviction filed within 12 months. This will be used as the response variable. The reason for using Eviction filed rather than State 1 & 2 is because there is a lack of evidence to prove they have a significant influence. The undetermined state "???" in FIG. 4 is not clearly defined by the landlord. Therefore, it makes 'Eviction filed' the earliest state that is prior to the actual eviction. After the eviction has been filed the tenants are given a period of time to pay back the outstanding rent. If the eviction process has gone through successfully, the tenant would then appear in court and seek a judgement of either paying back the rent money or being fully evicted. The time origin is the date when a tenant moved into the property provided and the failure time is the date on which eviction was filed.

In some examples, the Default event may be defined as whether the Eviction has been filed or not, and the response is Yes or No (1 or 0). Rather than giving the binary prediction for the response Y directly, Logistic Regression estimates the probability that Y belongs to the (default) group.

In some examples, logistic regression (LR) model may be used. For example, process 158 (in FIG. 1B) may use a LR model. Logistic regression models the relationship between the default probability $p(x)=P(Y=1|X)$ and the data X by using the logistic function $$p(X) = \frac{e\beta_0 + \beta_1 X}{1 + e\beta_0 + \beta_1 X}$$

where $\beta_0$ is the intercept constant and $\beta_1$ is the vector of coefficients for covariate X. After some rearranging, one would find that logit function of the p(X) is actually a linear regression equation:

$$\frac{p(X)}{1-p(X)} = e^{\beta_0+\beta_1 X} \Rightarrow \log\left(\frac{p(X)}{1-p(X)}\right) = \beta_0 + \beta_1 X.$$

To be able to estimate the coefficients, the maximum likelihood can be applied. The likelihood function for logistic regression is $$L(\beta_0, \beta_1) = \prod_{i:y_i=1} p(x_i) \prod_{i:y_i=0} (1 - p(x_j))$$

This takes the derivative of the log-likelihood function with respect to $\beta_0$, $\beta_1$, then sets the derivative to 0 to find the $\hat{\beta}_0$, $\hat{\beta}_1$ and maximises the likelihood function by solving the equation. The equation can be solved by using Newton-Raphson method with Fisher scoring, then using iteratively reweighted least squares for an iterative solution to the likelihood equation.

Logistic Regression can be only applied when the response of the default event is definite within a given time period. Hence if there are observations still being observed and the final outcome is indefinite, it cannot be used in the modelling framework. One common solution is just to throw away such observations and work with the samples which do have a definite outcome but considering that the sample size in this problem is quite small, reducing the sample size should be avoided.

Note that the LR method mentioned later generally refers to the LR applied to the dataset which have been modified for pure classification problem. The function used in R is glm( ) in form:
model lr=glm (formula, data, family=binomial ("logit")).

The data provided only contains the features for tenants who have submitted their application to the landlord. Unlike housing features, the behaviour of tenants and their features will vary with time i.e. are a function of time. Therefore, a time-independent modelling approach or static risk/matrix approach like LR is no longer suitable for this type of problem. In some examples, survival analysis, which focuses on when the event of default occurs, may be used, and is further explained below.

In some examples, survival analysis model may be used. For example, process 160 (in FIG. 1B) may use survival analysis model. Survival analysis was developed specifically to solve those types of problems. To be able to deploy such an analysis, a few conditions need to be fulfilled before solving the problem. They are as follows: the origin of time and the scale of the time passage need to be clearly defined; the event of failure needs to be well defined: for a particular group or groups of a population there exists a failure event or a failure point (e.g. death or default) that can be observed after a certain amount of time (failure time or default time) and it can only occur once.

One of the issues for conducting survival analysis is that survival time may not be fully observed, for example in FIG. 6, although tenant 4 has survived until September there is no guarantee that tenant 4 will not default or vacate a unit between October and December. These cases are called censored data, if the event occurs before the time origin it is left censored and if the event occurs after the time window it is right censored.

|  | Survival time | Default |
| --- | --- | --- |
| tenant 1 | 12 | 0 |
| tenant 2 | 2 | 1 |
| tenant 3 | 5 | 1 |
| tenant 4 | 9 | 0 |

Let us assume T is a continuous random variable with p.d.f. f (t) and c.d.f. F (t)=P(T<t) where T is referred to as the time of default (eviction filed). Let's define the survival function S(t) as the probability that time of default event T is after time t or the probability of survival until time T:

$$S(t) = P(T \geq t) = \int_t^\infty f(x)\,dx$$

The hazard function is defined as:

$$\lambda(t) = \lim_{dt \to 0} \frac{P(t \leq T < t + dt \mid T \geq t)}{dt}.$$

The hazard function $\lambda(t)$ is the limit when time interval tends to 0 of conditional probability when time T in between t and dt given by T happens after time t divided by the time difference. It is also called the instantaneous rate of occurrence of the time T.

By rewriting the conditional probability in the definition of $\Lambda(t)$ as a ratio of joint probability and then by applying the definition of S(t), one can obtain the following equation:

$$\lambda(t) = \frac{f(t)}{S(t)} = -\frac{d}{dt}\log S(t).$$

The second equality is obtained by using the fact that the derivative of S(t) is $-f(t)$ by the property of c.d.f. Integration of the above equation from 0 to t with the boundary condition S(0)=1 (an event would not happen at time 0 with probability 1) then S(t) can be written as:

$$S(t) = \exp\left\{-\int_0^t \lambda(x)\,dx\right\}. \quad (4.1)$$

The integral in the curly brackets is defined as the cumulative hazard function (CHF):

$$\Lambda(T) = -\int_0^t \lambda(X)\,dx$$

and is often referred as the total risk one would face from time 0 to t.

Figure 7:
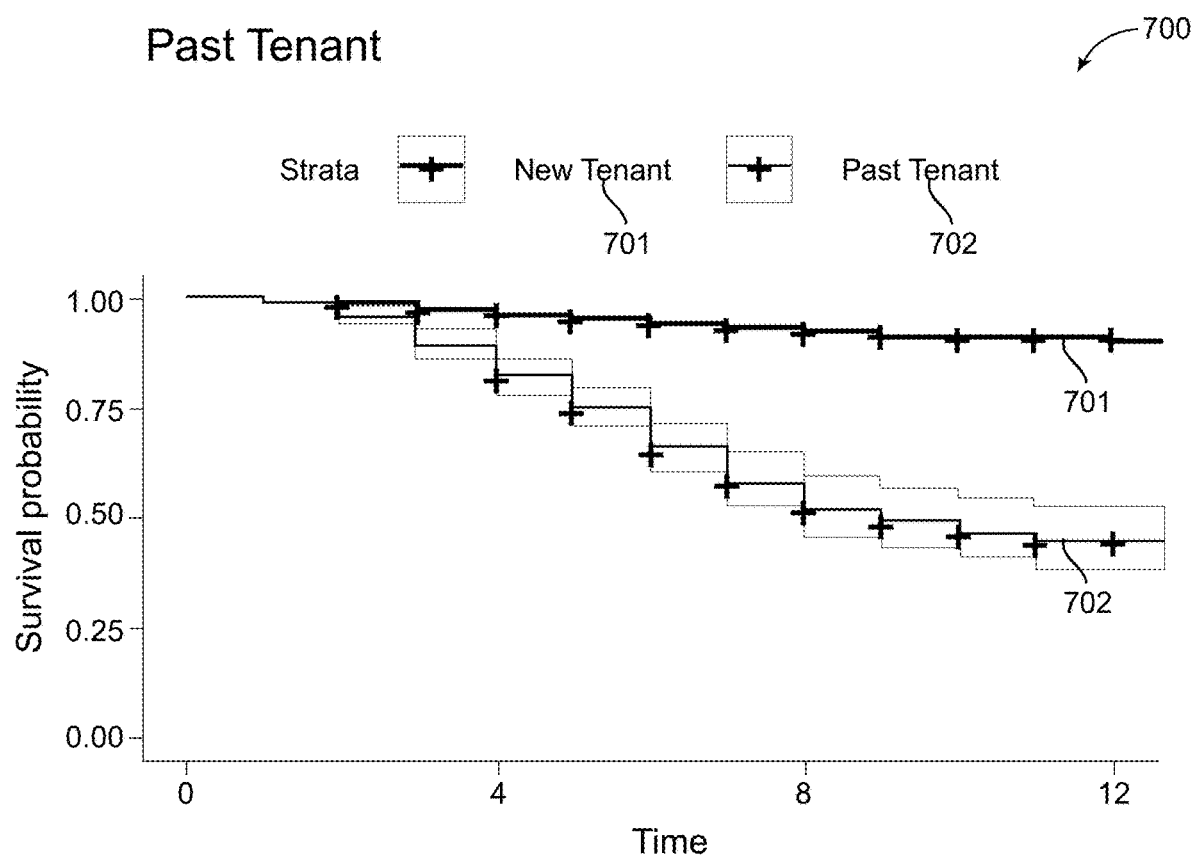
FIG. 7 illustrates Kaplan-Meier estimates for survival probabilities of past tenants and the new tenants, the default event being defined as original eviction filed.

FIG. 7 has demonstrated a common usage of the Kaplan-Meier (KM) estimator which is to check the differences between levels in the categorical variable. Usually in medical statistics the categories are treated and control groups of patients. Let i be the month of time when at least one of the default events happened, $i \in \{0, 1, \ldots, 12\}$, d the number of defaults at month i and $\eta_i$ the number of survived samples at month i. The Kaplan-Meier (KM) estimator S (t) is defined as:

$$\hat{S}(t) = \prod_{i:i \leq t}\left(1 - \frac{d_i}{n_i}\right)$$

This estimator provides the estimate of survival probability for a given time t which does not consider influences from other variables.

As shown in FIG. 7, the graph implies that the past tenant is less likely to survive longer than the new tenants, which is counter-intuitive. It is not uncommon for people to believe that past customers are more reliable than the new customers but it has been proven not true in this case for defaulting tenants, so further investigation is needed.

In some examples, a Cox Proportional Hazard model (Cox) may be used. A Cox model is inspired by Cox, which allows an easy connection between the characteristics of an individual tenant to the time at the event of default. It has a different assumption for the hazard function than the previously defined function. Cox has defined hazard function as:

$$\lambda(t,xi) = \lambda 0(t)\exp\{xi\beta\} \quad (4.2)$$

$i \in \{1, \ldots n\}$, where $\lambda 0(t)$ is the base-line hazard function for continuous random variable T. It represents the risk when xi=0. $\beta$ is a vector of regression parameters and $\exp\{xi\beta\}$ is the relative risk associated with xi.

Taking the log of (4.2) above one can see that the time dependent terms is separated from the covariates:

$$\log \lambda(t,x_i) = a_0(t) + x_i\beta,$$

where $a_0(t) = \log \lambda_0(t)$ and the model is in the form of an additive model.

By integrating both sides of equation (4.2) from 0 to t one can obtain the CHF $$\Lambda(t,x_i) = \Lambda_0(t)\exp\{x_i\beta\}.$$

Change the sign of CHF to negative and exponentiate the equation the survival function is obtained $$S(t,xi) = S0(t)^{\exp\{xi\beta\}},$$

where $S0(t) = \exp\{-\Lambda 0(t)\}$ is the baseline survival function.

It has been informally shown by Cox that maximising the partial likelihood is equivalent to maximising the usual likelihood, in the sense that both estimates are consistent, asymptotic normal distributions with asymptotic covariance matrix which can be estimated by the inverse of second partial derivatives of the log likelihood.

Let's define R(t) as the set of tenants are at risk at time t1. The conditional probability of tenant i defaults at time t1 give the tenant is at risk is $$\frac{\lambda(t_i, x_i)}{\sum_{i \in R(t_i)} \lambda(t_i, x_l)} = \frac{\exp\{x_i \beta\}}{\sum_{i \in R(t_i)} \exp\{x_l \beta\}}$$

If the baseline hazard function $\lambda_0$ is unspecified, then there is no additional information to be obtained about β. When there is no default happening in $(t_{i-1}, t_i)$ one can just assume $\lambda_0$ is close to zero, but if $\lambda_0$ is specified it would contribute towards the inference of β from the period that has no defaults. Take the product of the conditional probabilities to obtain the partial likelihood for β:

$$L(\beta) = \prod_{i=1} \left( \frac{\exp\{x_i \beta\}}{\sum_{i \in R(t_i)} \exp\{x_l \beta\}} \right).$$

The maximum likelihood estimate $\hat{\beta}$ can be obtained as a solution of a system of equations and estimated by Newton-Raphson method.

The following proposition suggests that in a Cox model, the rank order of the survival probability is preserved in the rank order of negative hazard (risk) score.

Proposition 1: The rank order of score is preserved in survival function S(t) for Cox model given any time t.
Proof Let $S(t) = _0\exp\{-\int_0^t \lambda(u)du\}$ be the survival function where $\lambda(u)$ is the hazard function at time u. In the Cox model the hazard function $\lambda(u)$ is $$\lambda(u,x) = \lambda_0(u)\exp\{x\beta\}$$

for the covariate vector x and coefficient vector β. By the equation (4.1):

$$S(t, x) = \exp\left(-\int_0^t \lambda(u, x)du\right)$$

$$S(t, s) = \exp\left(-\int_0^t \lambda_0(u)\exp\{\beta x\}du\right).$$

Let s:=−exp xβ be the score, hence S(t, x) becomes a function of s and t, i.e. S(t, s) which is written below.

$$S(t, s) = \exp\left\{\int_0^t \lambda_0(u)s\,du\right\}$$

where s is a survival score (not a probability) so if s is high it means less risky or more likely to survive. Suppose there exist scores s,s' such that 0>s≥s', then $$S(t, s) = \exp\left(s\int_0^t \lambda_0(u)du\right)$$

$$S(t, s) \geq \exp\left(s'\int_0^t \lambda_0(u)du\right)$$

$$S(t, s) = S(t, s').$$

So s≥s'⇒S(t, s)≥S(t, s'), which means if the survival (risk) score rank is the same then the survival (default) probability rank is the same.

To fit a Cox model in R, the coxph( ) function in package "survival" was used. The survival probability at a particular time cannot be easily calculated, hence the prediction used for scoring is of type "risk", which gives exp {xβ}. This was multiplied it by −1 then shifted and the score scaled into range (0, 1) to obtain a pseudo survival probability. The way to fit the Cox model and make a prediction was by using the following code:
model cox=coxph (formula, data)
predict (model cox, newdata, type="risk").

Figure 8:
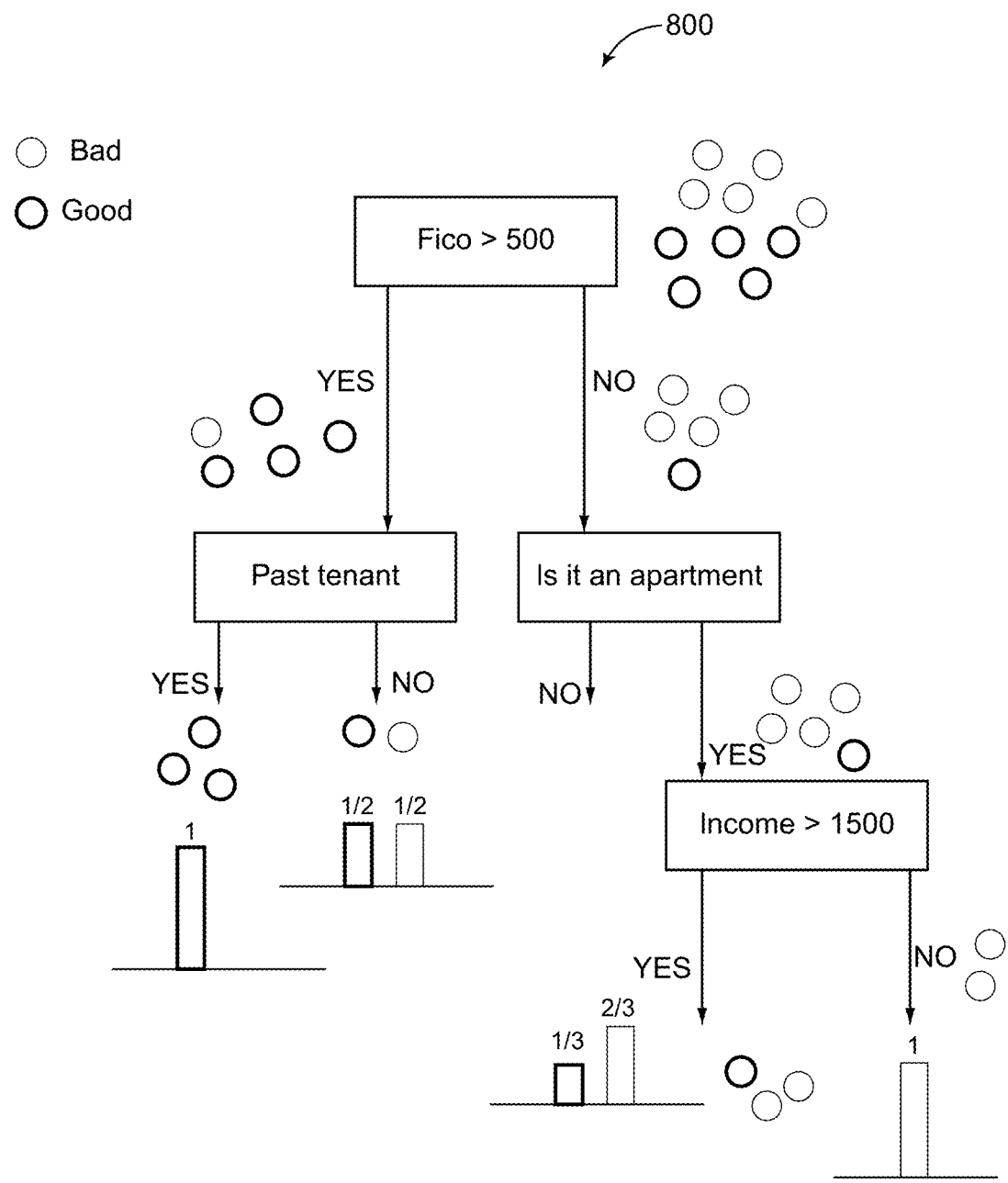
FIG. 8 illustrates an example of a decision tree for a two classes classification problem, the probability of the new observation can be estimated by using the proportion of each class at the leaves (end nodes).

In some examples, tree-based methods may be used. For example, process 162 (in FIG. 1B) may use a tree-based model. Tree-based methods include segmenting the predictors which can be summarised by a tree (FIG. 8). There were 3 different types of tree-based method for modelling: regression, classification and survival. Regression trees are used for a numerical response variable, classification trees to categorise data into different classes (usually binary) and the survival tree for survival analysis which can predict the probability of survival at a particular time. Below is an example of a typical decision tree for classification of two classes.

In FIG. 8 there are 10 samples in total, 5 samples good and the other 5 bad. The first condition is whether this point has a FICO score greater than 500. Like a flow chart, this condition splits our samples into two groups, then more conditions have been added and checked. Note that after the first condition it is not necessary to interrogate the two groups with the same condition at the same time (so, for example, you can ask one group "whether they have previous tenancy history" and ask the other group "is the property they lived in an apartment").

At the terminal nodes of the tree, there are different data points ending up in different end nodes. For example, if there is a new observation and would like to estimate the probability of this point being Bad when the new observation has FICO>500 and it's not a past tenant then the probability is 0.

The advantage of using decision trees is that they are very easy to interpret visually if only a few features were used. They work very well with quantitative or numerical data.

In some examples, a Random Forest (RF) method is used. The basic idea of the Random Forest (RF) method is using out-of-bag (OOB) samples to build many decision trees and using these trees to predict and estimate the response variable. OOB means to sub-sample data continuously and use them for training. In this case the sub-sampling can be done with replacement, for example, to use a tree to predict which class the new observation belongs to (FIG. 8). If 1000 decision trees were built with different ways of splitting the nodes, and the majority of the trees classified the new observation as class Bad, then it is more likely that the new observation will end up in the Bad category.

In some examples, in predicting especially long or short tenancies (or explicitly including evictions in the model), other methods may be implemented for counteracting under-sampling problems. For example, Synthetic Minority Oversampling TEchnique (SMOTE) may be used to form a minority class oversampling. Whereas minority oversampling can incorrectly infer features which are just random aberrations in the minority class due to the smaller sample size (which are amplified by the oversampling), SMOTE may correct for this by adding "synthetic" members of the minority class. In some examples, the system may choose two minority members, and linearly interpolate the features between the two at a random distance, creating a new minority class member, which is minimally different from existing elements in the data set.

Figure 9:
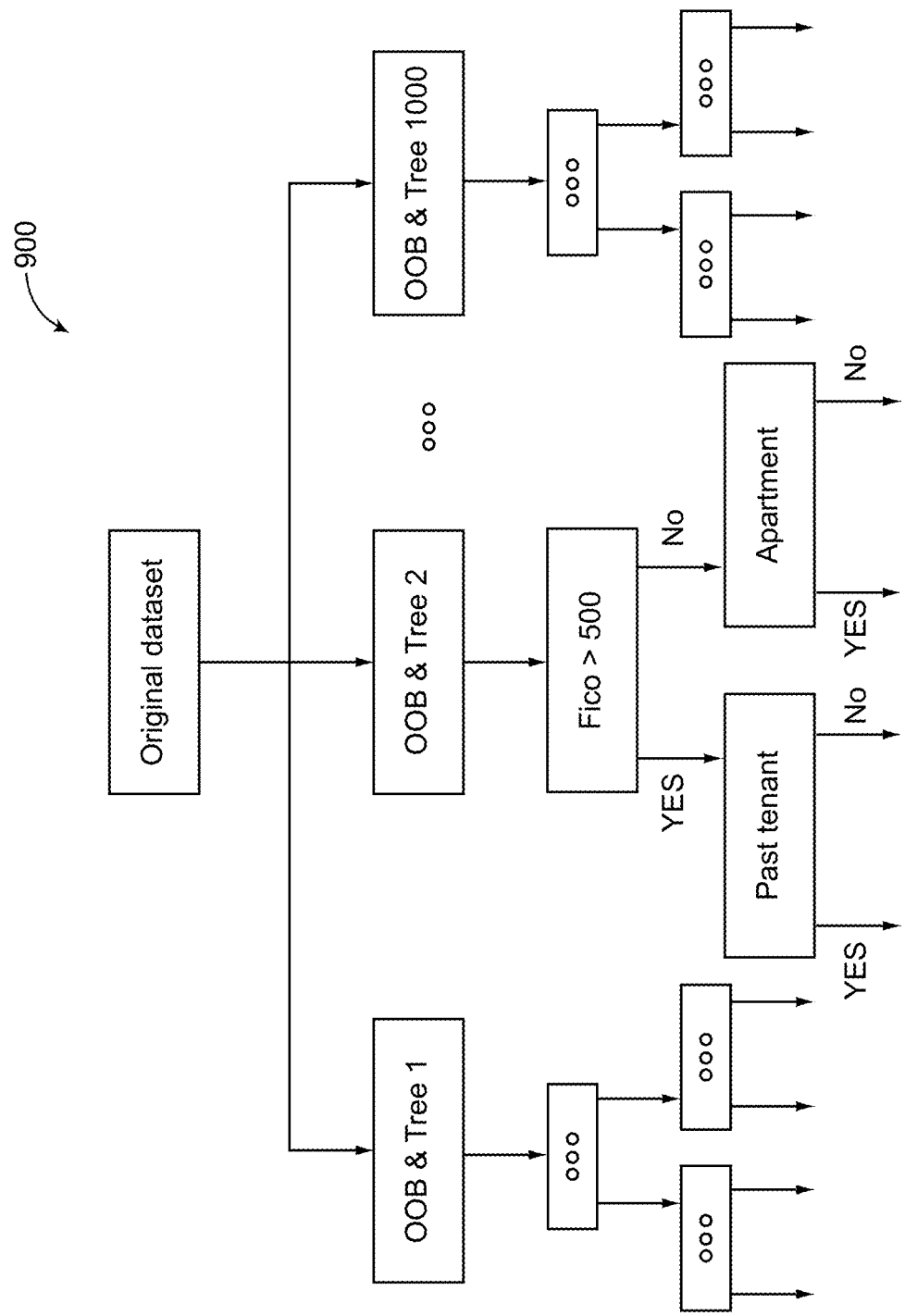
FIG. 9 illustrates an example random forest method in accordance with some examples described herein.

One of the benefits of using this method is that RF de-correlates trees which means it is not only immune to features that were highly correlated but also reduces the variance compared to just using a single decision tree. One of the down sides of using RF is the results are not as easy to interpret visually as the decision tree because RF involves using many different decision trees. However, with some simplification, one can visualise it, as shown in FIG. 9, which shows that 1,000 decision trees have been constructed using OOB samples, within each tree the node splits is according to randomly selected features In some examples, the Random Survival Forest (RSF) may be used. In addition to the RF, RSF has an extra condition for splitting the nodes. Conditions are: at every split it needs to maximize the survival difference between daughter nodes; the tree will grow until the terminal node should have no less than some number $d_0>0$ (by default $d_0=3$ in R) of unique deaths, then CHF is calculated for each tree for estimating the survival probability, etc. The extremity nodes in a saturated tree are called terminal nodes. A saturated tree is a tree that uses all splits and generates the finest partition for the selected predictors.

The tool used for estimating the CHF for each terminal nodes is called the Nelson-Aalen estimator. The estimate of CHF at time t, $\hat{H}(t)$ is defined below:

$$\hat{H}(t) = \sum_{t_i \leq t} \frac{d_i}{Y_i}$$

where $t_i$ are the distinct default times in data, $d_i$ is the number of default at time $t_i$ and $Y_i$ is the number of individuals at risk at time t1.

The estimated survival probability can be simply calculated using $\exp\{-\hat{H}(t)\}$. The RF method was implemented by using R function ranger( ) with 1500 trees. The reason for choosing 1500 was that if the number is too large there is a risk of overfitting and it is computationally expensive to use any number that is greater than 1500. Too time consuming a method for fitting the model would not appeal to the landlord if a live scoring system is what they desired. The input R code would be in the form:
model rf=ranger (formula, data, num.trees=1500, write.forest=TRUE). In the present disclosure, RSF may be generally referred as RF.

In some examples, Gradient Boosting (GB) may be used. For example, process 164 (in FIG. 1B) may use a gradient boosting model. GB is an ensemble method that can be used for regression, classification and survival analysis. In essence, it takes many weak learners, studies their weaknesses then "learns the lessons" sequentially so that in the end those "lessons" enable the machine to give a powerful predictor. In terms of procedure, FIG. 10 shows an example of a GB algorithm: initially it fits a simple model for the data (Fit 1) and computes the error residual, then it fits a new model on these error residuals (Error of Fit 1). Combining the two models obtains a more complex and better model (Fit 2). Then this process is repeated until convergence.

The Gradient Boosting method was built on top of the Cox Proportional Hazard model for the right-censored data. Let $Y \in \{-1, 1\}$, $F(x) \in (-\infty, \infty)$ be the classifier which quantifies the confidence of classifying observations. In some examples, the Real AdaBoost algorithm or a more defined version of the AdaBoost algorithm may be used to generate the weights needed for GB.

In performing the Real AdaBoost algorithm, weights were initialised for each of the N observations to $w^{(1)}=1/N$. For t in 1, . . . , T iterate the following steps. The algorithm proceeds as follows:
1. Using the weights, estimate $P(Y=1 \vee x)$.
2. Set $$H_t(x_i) = \log \frac{\hat{P}(Y=1 \vee X)}{P(Y=1 \vee X)}.$$

3. Update the observation weights as $w_i^{(t+1)} = w_i^{(t)} e^{-\alpha_t y_i h_t(x_i)}$
4. Normalise $w_i^{(t+1)}$ so they sum to 1.

where $a_t$ is a tuning parameter which is set to 1, it allows the algorithm to revert back to the original AdaBoost Algorithm if appropriate value is been used. The generated weights $w_i$ for N observations by using the algorithm above are then used in the next algorithm for Cox model.

In some examples, the Boosting algorithm proceed as follows:
Initialize $\hat{F}(x)=0$. For t=1, . . . , T proceed as follows:
1.1 Compute the working response $$z_i = \delta_i - \sum_{j=1}^{N} \delta_j \frac{w_j I(t_i \geq t_j) e^{\hat{F}_i}}{\sum_{k=1}^{N} w_k I(t_k \geq t_j) e^{\hat{F}_k}}$$

1.2 Construct regression model, f(x), predicting zi from the covariates xi.
1.3 Fit a linear proportional hazard model to the response (t, δ) with linear predictor f (xi), offset F (x) and regression coefficient ρ.
1.4 Update the estimate of $\hat{F}(x)$ as $$\hat{F}(x) \leftarrow \hat{F}(x) + \rho f(x).$$

where $z_i$ is the gradient, $\delta_i$ is the death indicator. The loss function $\Psi(y_i, F)$ is been defined as the negative partial log likelihood in the general version of GB algorithm.

$$\Psi(y_i, F) = -\sum_{i=1}^{N} \delta_i \left[ F(x_i) - \log\left(\sum_{j=1}^{N} I(t_j \geq t_i) e^{F(x_j)}\right) \right]$$

(negative log-partial likelihood)

where $F(x_i)$ is the function one would like to estimate. In this case it is the hazard function, $I(t_j > t_i)$ is the indicator function of event $(t_j \geq t_i)$. At the end, what one should obtain from the algorithm is the $\hat{F}(x)$ which estimates the hazard or risk for covariate x. In some examples, the GB method may be implemented by using the gbm( ) function in R in package "gbm". The following is the code:

model gb=gbm(formula, data, num.trees=1500, distribution="coxph").

In some examples, features are selected for the various prediction processes described herein. It should be possible to ascertain that the final model would not introduce any additional biases against landlord-specific features or any of the minority group features such as ethnicity and age. Those features were removed completely from the data prior to undertaking any analysis. Moreover, features relating to geo-location such as city, state, zip code, zone and information that could indicate geo-location indirectly through the description of the unit amenities were also eliminated from the data. The industrial standard for the number of features is around 15, to avoid an over-fitted model which may not be attractive to a new landlord, or lender interested in solving a similar problem.

The importance option in function ranger( ) when set to "permutation" implements the Breiman-Cutler permutation, For each tree that has been built, the prediction error on the OOB data is recorded. Given a variable, e.g., x, OOB data are randomly permuted in x and record the prediction error. The importance for x is then the average of the differences between the perturbed and unperturbed error rate over all the trees in the forest.

The relative influences in gbm( ) may be used. For tree-based methods the approximate relative influence of variable xi is $$J_i^2 = \sum_{splitsonx_i} I_i^2,$$

where $_iI^2$ is the empirical improvement by splitting on variable xi at that point. Friedman's extension to boosted models is to average the relative influence of variable $x_i$ across all the trees generated by the boosting algorithm. To compute the relative influence simply execute function summary( ) of the gbm object in R.

TABLE 7

The ton 10 importance features according to the inbuilt importance function in Random Survival Forest.

| Features | RF importance | GB relative influence | RF rank | GB rank |
|---|---|---|---|---|
| Past.Tenant | 0.02566998 | 51.18467472 | 1 | 1 |
| log Rent.Tenant.Responsible.For | 0.016424673 | 8.539880454 | 2 | 3 |
| FICO | 0.015431834 | 27.1420707 | 3 | 2 |
| HEAT PAID BY | 0.014633646 | 7.333793158 | 4 | 4 |
| log Unit.Rent | 0.010497739 | 0 | 5 | 15 |
| TOTAL AREA | 0.008788586 | 0.090223802 | 6 | 9 |
| BEDROOMS | 0.008011161 | 0.764918701 | 7 | 6 |
| Rent.to.Income.Ratio | 0.007439746 | 0.13259033 | 8 | 7 |
| Subsidy. | 0.00695741 | 0.87168667 | 9 | 5 |
| Income.monthly | 0.006928706 | 0 | 10 | 16 |

The 10 features in Table 7 were used across all models, one may argue a different feature selection criterion may obtain optimal results but for a consistent result this report uses fixed features across different models. Note that GB relative influence of log Unit.Rent have no influence on the prediction but RF's importance suggests they were fairly predictive. This shows the difference in terms of the two different concepts of modelling. One is randomly selecting the feature, creating many variations then taking the average, another uses a sequential approach of fitting and updating the model structure.

By applying the 4 models described herein, such as boxes 158, 160, 162, 164 (in FIG. 1B), the system may obtain 4 different types of score. The scores represent different quantities by using the inbuilt predict( )functions in R when different model objects were passed, the predict function would give prediction correspondingly. For example, box 158 generates the default probability, box 160 generates the risk measure, box 162 generates the survival probability and box 164 generates the hazard scale. Not only different quantities are produced, but they were also in different scales which makes them impossible to compare to each other, hence the system further performs normalisation 166, 168, 170, 172, to respectively transform the scores of 158, 160, 162 and 164 into range [0, 1] before taking an average.

The following cross validation is used to determine how the averages are calculated by accessing the stability of the models.

TABLE 8

Results of 5-fold cross-validation of AUCs for different combinations of scores with mean and variances.

| Models used | AUC mean | AUC var. |
|---|---|---|
| LR GB | 0.7176 | 0.00008638 |
| Cox GB | 0.7154 | 0.00009587 |
| RF GB | 0.7390 | 0.00010111 |
| LR RF GB | 0.7414 | 0.00010439 |
| LR Cox GB | 0.7234 | 0.00011577 |
| Cox RF GB | 0.7408 | 0.00011612 |
| RF | 0.7550 | 0.00016146 |
| GB | 0.6988 | 0.00020620 |
| LR RF | 0.7535 | 0.00035776 |
| Cox RF | 0.7529 | 0.00036475 |
| LR Cox RF | 0.7449 | 0.00047480 |
| LR | 0.7168 | 0.00071104 |
| LR Cox | 0.7161 | 0.00075689 |
| Cox | 0.7150 | 0.00082245 |

To be able to assess the stability of models, a 5-fold cross validation has been carried out. Table 8 below is the outcome of 5-fold cross-validation results for AUCs using different combinations of average scores. Note: the samples were split in a way that the defaulted population were uniformly distributed into the 5-fold sets, hence there's no risk for imbalanced models and predictions. The table is ordered from the lowest variance to highest. The highest average AUC was achieved by using only the RF score. The variability shows it performed well compared to other single models. Using more than 1 model improves the variance but with a trade-off for lower AUCs.

Although the average AUC seems to be quite invariant to the change of cross-validation sets, usually ranging around 0.70 to 0.75, the variances were quite sensitive to which sets were chosen to train. Therefore if the cross-validation was repeated with an alternative way of splitting the 5-fold sets, the table would look very different in terms of ranking of variances.

By examining multiple results for cross-validation, two of the averages were chosen for further analysis because of consistently good performance in the averaged AUCs and variances amongst the other combinations of averages. In some examples, the following two averages are calculated:

$$\text{Average 1} := \frac{(LR \text{ score} + Cox \text{ score} + GB \text{ score})}{3},$$

$$\text{Average 2} := \frac{(Cox \text{ score} + RF \text{ score} + GB \text{ score})}{3}$$

Now, the process of voting (e.g., 174 in FIG. 1B) is further explained. Let vote $v_i$ for tenant i, $i \in \{1, \ldots, N\}$ be the sum of the binary prediction produces by 4 models $$v_i = LR \text{ prediction} + Cox \text{ prediction} + RF \text{ prediction} + GB \text{ prediction}$$

Voting is used after the cut-off point has been chosen and the prediction has been done. The votes $v_i$ can be computed since the voting process only maps the votes to the binary outcome 0, 1. The number of votes that are sufficient to predict an entry as Positive may vary. In an example, the system may generate a Positive result only when all 4 models predict Positive. Other variations may also be possible.

Now the system is further explained in terms of training the models. Vote is a set of analytical methods applied to carefully selected tenant applicant data in order to obtain one or more scores indicating whether they are predicted to be a good or bad tenant, where a bad tenant defaults on payment and has to be evicted. The score is a real number between 0 and 1, and the higher the score (survival score) the less risky the tenant is. The survival score and risk score are related by the following equation risk score=1−survival score.

If required, a score can be transformed into a 3-digit real number [1, 999], if that is the format required by the landlord or lenders. In later sections, when score is mentioned it will indicate the magnitude and type where the large risk score means bad but high survival score means good.

To clarify some potential confusion that may be caused by notation: RF in the following section refers to the RSF considered at the 12-month horizon (a tenant defaulting or vacating a unit in 12 months) and GB refers to the Gradient Boosting applied to the survival model—Coxph or Cox model. In some examples, the system may determine a cut-off for the Cox model.

Making the prediction whether given tenants are good or not, it is necessary to choose a threshold score (survival) or a cut-off point where any score below it is classified as bad, and above it as good. Optimum cut-off is the point which gives the most balanced values for Accuracy, Sensitivity and Specificity. The False Negative rate is the measure that should be minimised since if the model predicts someone is good, the probability that the tenant is actually a poor risk tenant, the FN rate, needs to be small.

Figure 11:
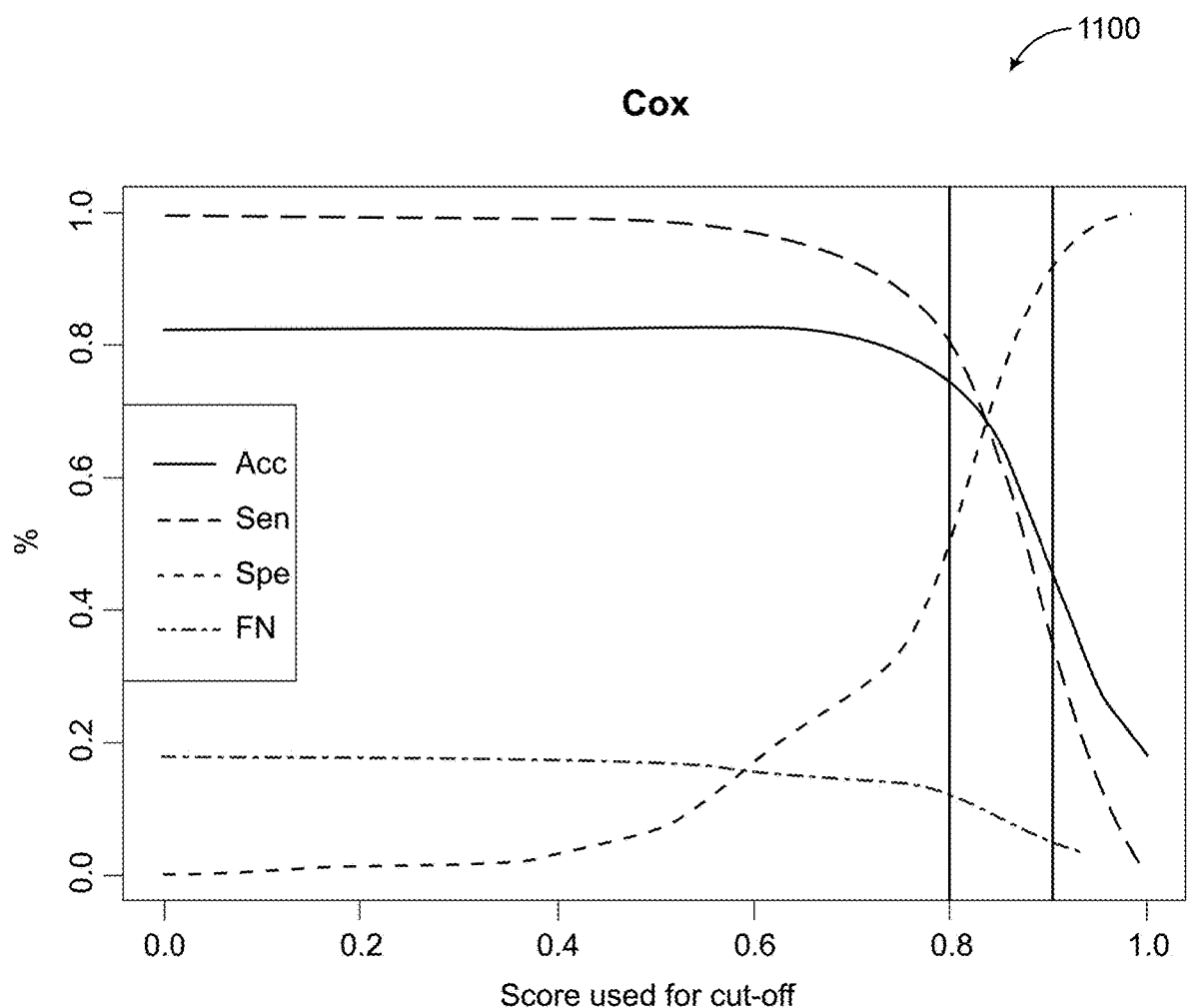
FIG. 11 illustrates the best choice of the cut-off point in a Cox model. From top to bottom, the key box shows Accuracy (Acc), Sensitivity (Sen), Specificity (Spe) and False Negative rate (FN). Acc, Sen and Spe should be maximised and FN minimised. The vertical solid lines assist to locate the cut-off point.

In FIG. 11, the analysis for cut-off in the case of the Cox model is critical. If a low score been chosen, one would obtain maximum Accuracy and Sensitivity but as a sacrifice, the Specificity and False Negative rate would not be optimised. In other words, the scores will predict the Bad tenant extremely well but at the same time, it will penalise some Good tenants and treat too many Good tenants as Bad tenants. Therefore, the choice of cut-off point should achieve the most balanced outcome for all 4 measures, this is achieved at the point where Accuracy, Sensitivity and Specificity curves cross.

Figure 15:
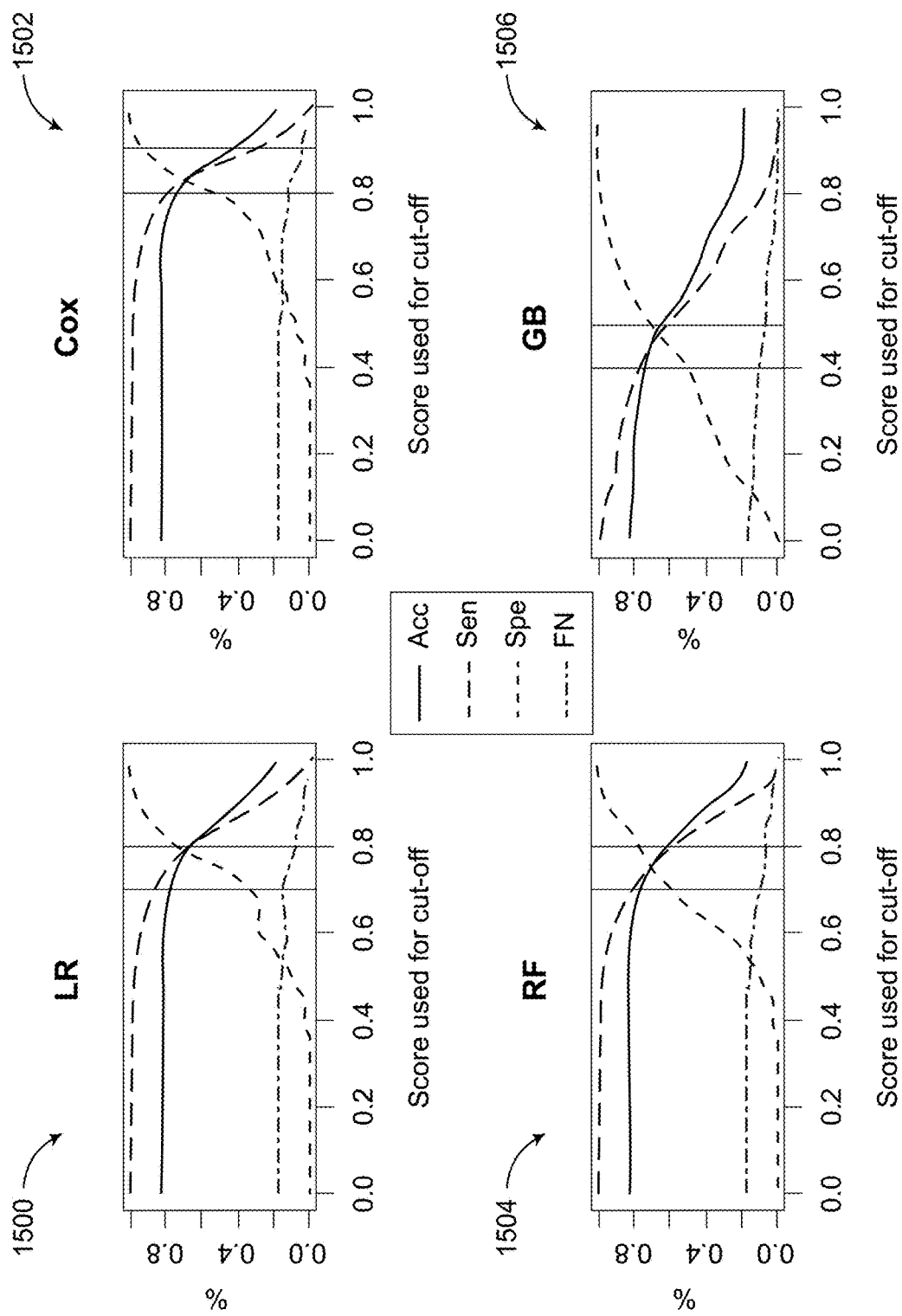
FIG. 15 illustrates cut-off analysis graphs of the 4 models.
Figure 16:
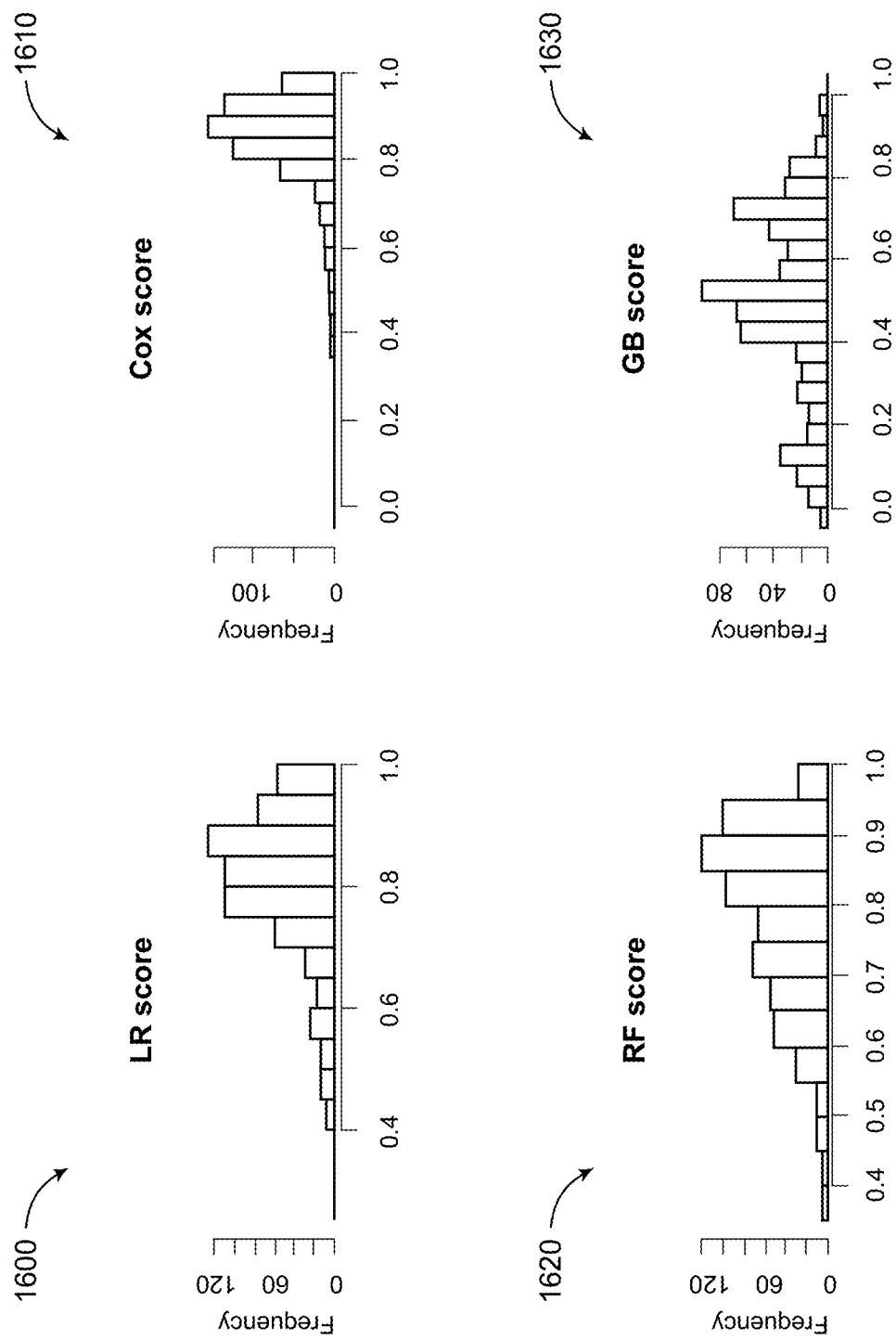
FIG. 16 illustrates the distribution of the scores of one particular testing set. Note that GB has tri-modal distribution which is different to the other three.
Figure 17:
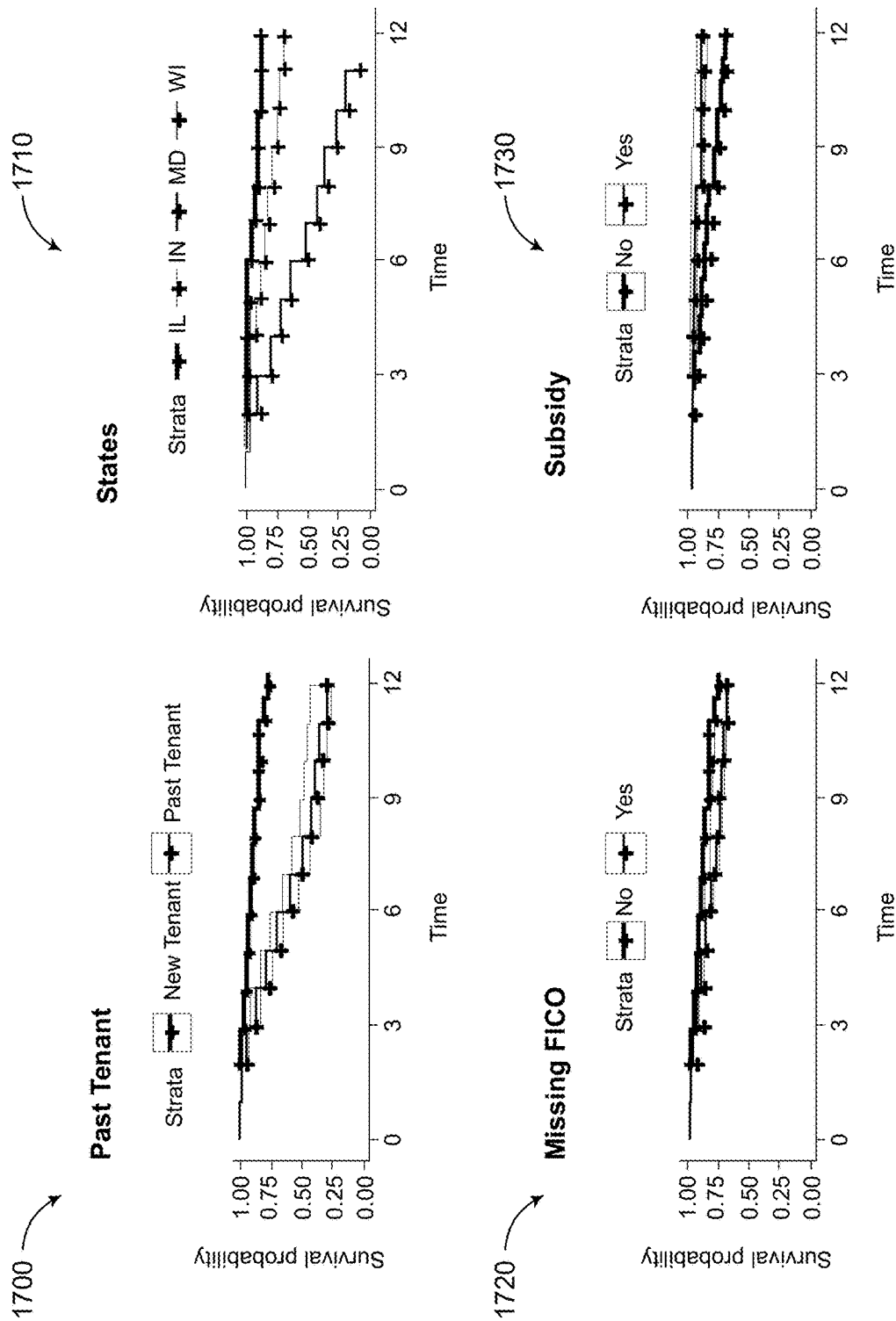
FIG. 17 illustrates Kaplan-Meier survival probabilities for different categorical variables in the data.

Table 9 shows the suggested cut-off points for each model, the graph used for determining these points were included in FIGS. 15-17. For the purpose of business, the cut-off point can vary depending on how many applications are approved with a particular cut-off point. Although a given cut-off point may achieve a very high Accuracy and low default rate it may not be approving anyone using the pre-chosen threshold.

TABLE 9

Different cut-off point as 3-digit survival scores suggested for each model.

|  | LR | Cox | RF | GB |
|---|---|---|---|---|
| Cut-off score | 800 | 840 | 700 | 470 |

In some examples, the system may determine the training and testing set sizes. For example, the original data set may include 3216 sample points. One very common choice is to split the data into 70% as the training set and 30% as the test set, but since the data set is fairly small in this case, one should not expect excellent results from a 30:70 split of this small sample set.

Training was begun by randomly selecting 1000 samples as the test set then gradually increasing the training set size from 100 to 2200, sampled randomly from the remaining 2216 data points. The reason for choosing the test sample size to be 1000 is because the landlord receives about 1000 applications per month and treating this test set as the new applications with a known result is very beneficial. Then, the model was fitted with these training sets and the AUC recorded after the models had been fitted on to the test set. The result can be seen in FIG. 12.

Figure 12:
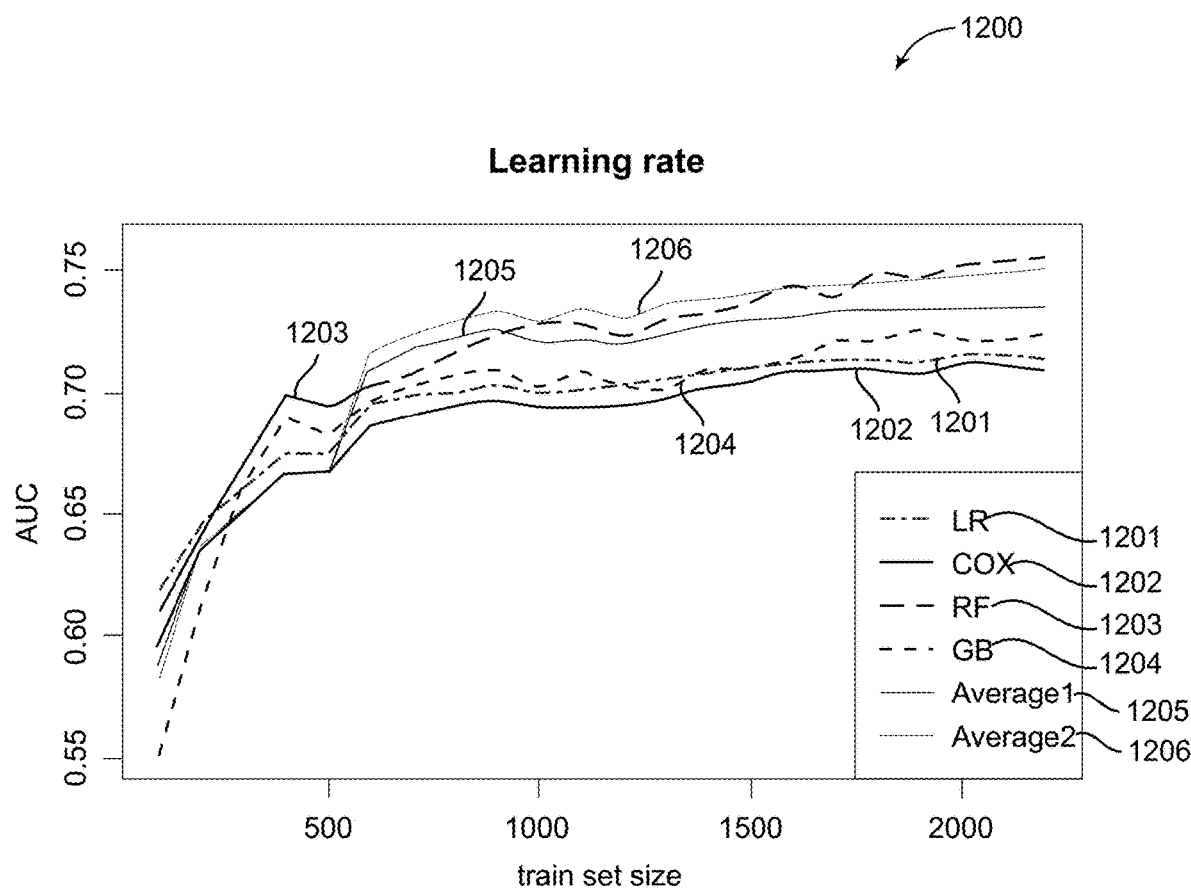
FIG. 12 illustrates area-under-curve. (AUC) performance with testing set fixed at 1000 and increasing sizes of the training set.

Overall, the scores behaved very similarly to each other as the size of the training set increased (FIG. 12). The comparison of the models can be divided into two periods: the period from the training set sizes are 100 to 500 and 500 to 2000. If the size of the training set is smaller than half the size of the test set, i.e. 100-500, the RF seems to be the best choice for modelling since it constantly produces the highest AUC. As the size of the training set got larger, the difference between RF and Average 2's AUCs became smaller and smaller and Average 2 outperformed RF most of the time.

Figure 13:
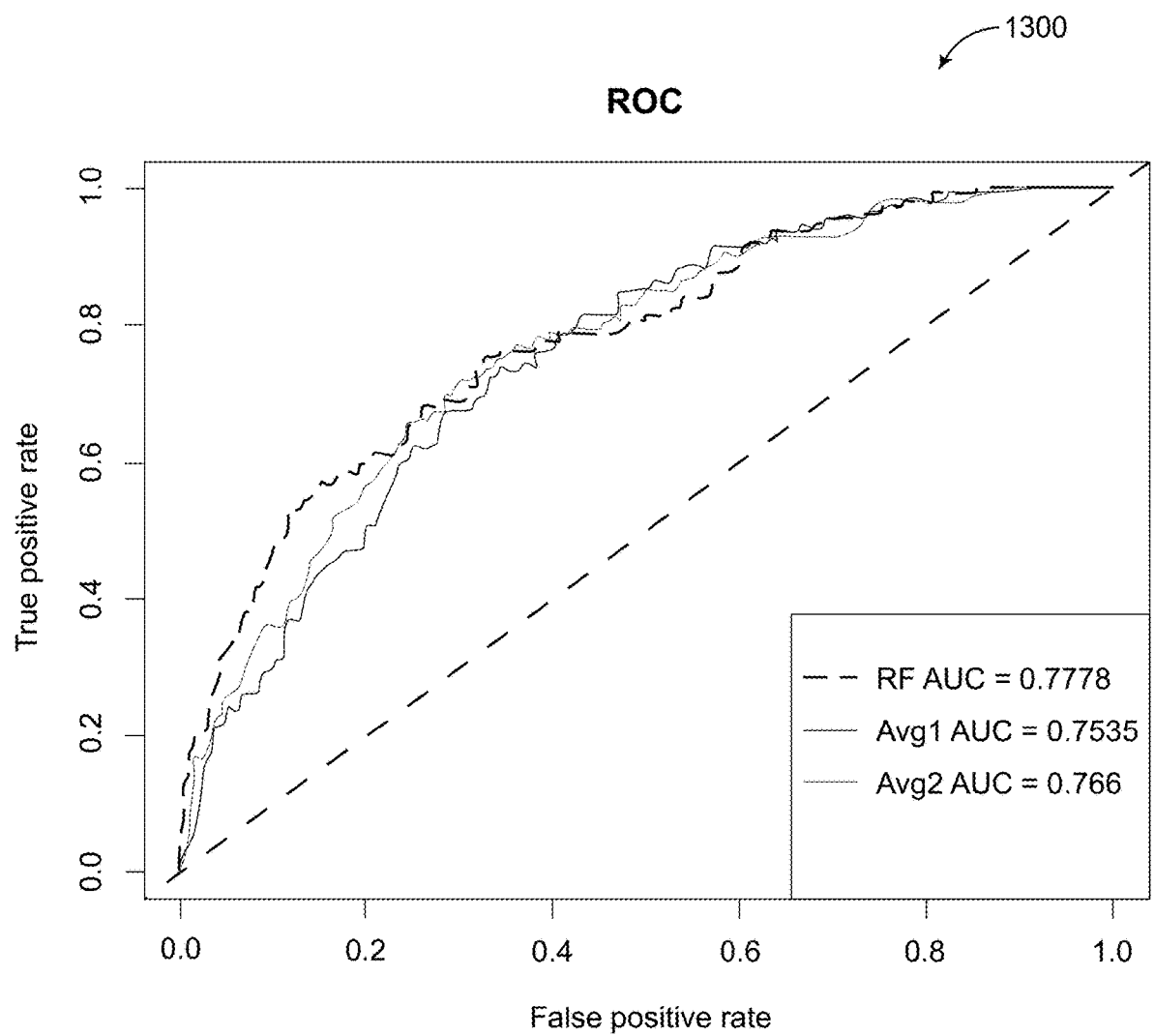
FIG. 13 illustrates a ROC curve for 3 models' risk score as a benchmark.

In some examples, the data may be split into an 80% training set and a 20% test set. FIG. 13 shows the ROC curve for the RF, Average 1 and Average 2 scores of the test set. Since the split has been done in a random way, one may argue the graph does not represent a consistent result. But in fact, the consistency has been checked by repeatedly splitting the data set and testing the results on the test set. This method yielded similar results across alternative ways of splitting the dataset to that shown in FIG. 13, hence no additional bias was introduced by using any particular random split for the testing set.

The lowest ROC curve, in black, is the score landlord is currently using for applicant screening. From the interpretation of FIG. 2 (Evaluation section), then an AUC close to 0.5 indicates the score is not much better than just random guessing. The RF, Avg1 and Avg2 scores all perform better than the old score as indicated by the much greater AUCs (0.7778, 0.7535 and 0.766 respectively). The old score with its low threshold can actually misjudge the result completely because the convex shape of the curve occasionally falls below the diagonal line (left side of the black solid curve). The stretch of the RF curve in the left side (green solid line) indicates that the RF model outperforms the others with a particularly low threshold, so that RF will perform much better than current predictors when the population of approved applicants needs to be restricted.

After the models had been fitted, scores could be computed from these models for each tenant. This section discusses how similar are the scores produced by different models mentioned in the previous section. Table 10 shows that most score rankings are strongly positive correlated to each other. Average 1 and 2 scores have consistently high correlation since they were constructed by the remaining 4 scores. LR and Cox's score ranking have a very high correlation (0.9958), although this should come as no surprise since LR and Cox are closely related and both involve linear forms. In contrast, the Cox and LR ranks are least correlated to RF rank in Table 10. The reason is the difference in model structure. Similar observations will appear in the next section when discussing AUCs.

TABLE 10

Correlation matrix of the ranks in each scores.

|       | LR     | Cox    | RF     | GB     | Avg. 1 | Avg. 2 |
|-------|--------|--------|--------|--------|--------|--------|
| LR    | 1      |        |        |        |        |        |
| Cox   | 0.9958 | 1      |        |        |        |        |
| RF    | 0.6640 | 0.6555 | 1      |        |        |        |
| GB    | 0.7008 | 0.6762 | 0.6701 | 1      |        |        |
| Avg. 1| 0.8998 | 0.8833 | 0.7275 | 0.9311 | 1      |        |
| Avg. 2| 0.8230 | 0.8061 | 0.8703 | 0.9238 | 0.9547 | 1      |

By using the Delong test described in this disclosure one can obtain the resulting P-values of the pairwise tests which are presented in Table 11. This table shows that all the Average 1 and 2's AUCs were significantly different from other single model AUC scores with a 0.05 significance level, which indicates that the averaging method does improve the AUC.

TABLE 11

The p-values for pairwise Delong test of the AUCs of the scores.

|       | LR      | Cox     | RF      | GB       | Avg. 1   |
|-------|---------|---------|---------|----------|----------|
| Cox   | 0.2052  |         |         |          |          |
| RF    | <2.2e−16| <2.2e−16|         |          |          |
| GB    | 0.313   | 0.4233  | <2.2e−16|          |          |
| Avg. 1| 0.0182  | 0.0163  | <2.2e−16| 4.368e−06|          |
| Avg. 2| <2.2e−16| <2.2e−16| <2.2e−16| <2.2e−16 | <2.2e−16 |

Some testing runs were conducted to show how good the Vote prediction is. The test was done by repeating the training and testing 100 times, each time using a different way for splitting the sample set into test and training points. Cut-off points controlled Specificities at 0.6 so that the effect of voting could be seen and compared. Table 12 shows the results of the test. Even though the Vote method increases Accuracy and Specificity by about 10%, the Sensitivity decreases, which implies the Vote is good at picking up the Good tenants correctly but bad at predicting the Bad tenants precisely, not to mention that it is also very important not to reject too many Good tenants. The Vote method can improve the TN rate which means a better quality of approved applicant population but also it rejects lots of potentially good tenants. If it does not conflict with the business objective then Vote can be applied to boost the quality of the approval population.

TABLE 12

Result of the Accuracy, Sensitivity and Specificity (fixed) performed 100 times. The * indicates improvement in performance made by Vote. The grey cells indicate the Specificities have been tuned to be close to 0.6 to enable comparison of the results.

|      | Acc. mean | Acc. var. | Spe. mean | Spe. var. | Sen. mean | Sen. var. |
|------|-----------|-----------|-----------|-----------|-----------|-----------|
| LR   | 0.6361    | 0.00034   | 0.6042    | 0.00059   | 0.7281    | 0.00137   |
| Cox  | 0.6322    | 0.00037   | 0.6079    | 0.00061   | 0.7325    | 0.00134   |
| RF   | 0.6315    | 0.00038   | 0.6014    | 0.00063   | 0.7681    | 0.00113   |
| GB   | 0.6350    | 0.00604   | 0.6158    | 0.01604   | 0.6338    | 0.02240   |
| Vote | 0.7333*   | 0.00028   | 0.7850*   | 0.00123   | 0.5203    | 0.01050   |

In some examples, when scoring is required for new applications, the volume of new application and existing data size may be used to determine which of various models may be used for scoring. For example, if the new applications received by the landlord amount to more than twice the existing entries in the database, then RF should be used, otherwise Average 2 should be used to score the applications.

In some examples, several features were selected according to the importance of RF and relative importance of GB. For example, the features may include
  Past tenant, i.e. whether or not the tenant is a past tenant of the landlord,
  log (rent tenant is responsible for), i.e. log of the rent tenants should pay,
  FICO, the credit score provided by a third party.

To understand why these features were selected for eviction: at least past tenants generally are less risky than new tenants (because they have avoided being evicted so have a good track record); how much you pay for the rent is a direct factor and FICO is a credit rating "opinion" from a third party. However, the coefficient of the feature 'Past tenant' in our LR model is 1.235, which is saying it is more likely to default when the tenant is a past tenant. This fact is very counter-intuitive and may be caused by the confusion of the definition for this variable, i.e. it has the opposite meaning to the normal indicator variable (1=new tenant, 0=past tenant).

In some examples, the computation intensity of computing a score may also be used when choosing which score to use. For example, the Average 2 score require 3 different types of score to be calculated including RF, but RF on its own performs fairly well, no matter what size the new dataset is. There is always a trade-off between using one or another score. Even RF may not be computationally as heavy as the Average 2 score, but by the nature of RF it may have a higher variation than the Average scores. In Table 8 this is demonstrated by the RF having higher variance in AUC than the Average scores. Therefore, if only one type of score is used for any future application scoring, Average 2 score is suggested because of its stability and low variation during testing.

In some examples, the behaviour of the population may not be time invariant which means that the distribution of future applications may change dramatically. This may be caused by some external or internal factors. Hence the system may keep monitoring the distribution of scores perhaps once per month or once per quarter to give the landlord a very good early warning that an update of the scoring system may be required.

In some examples, the system may reject inference when samples are biases. For example, the samples may be biased when chosen by the landlord using what may be considered to be an ambiguous selection criterion. For example, it can be assumed that under their criterion, the landlord had been very unlikely to accept applicants who had a history of evictions or criminal activity. Interestingly, landlord did not reject all of those who have a bad history: although only a very small proportion of the population (7%), the landlord might just accept those low-quality applications so they were able to meet a certain target they had set beforehand. This is useful since it added more value to the analysis, because in future it may be beneficial to know more about how those marginal people behave if they are accepted as tenants.

Figure 14A:
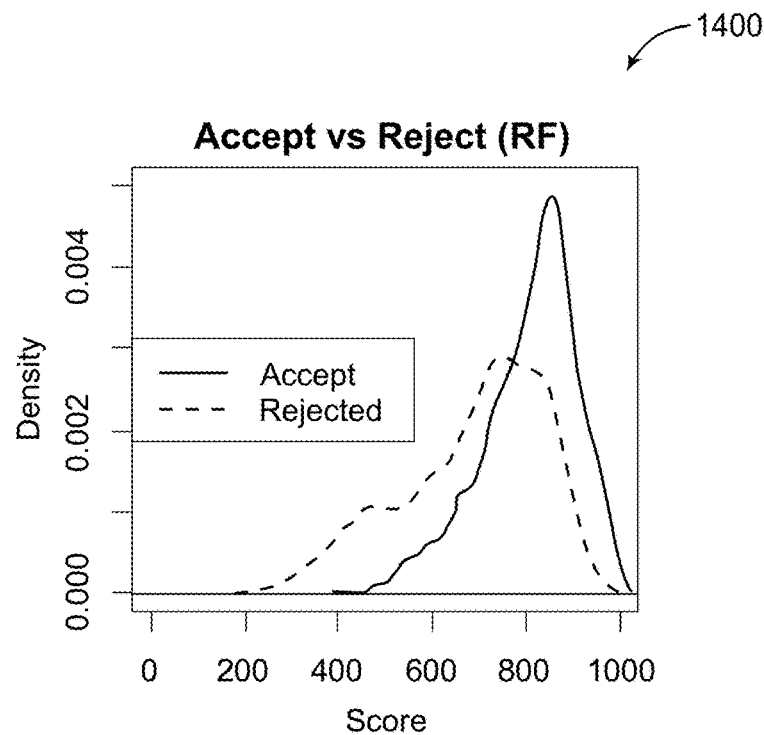
FIG. 14A illustrates a chart showing a density of scores for Accept and Reject populations using RF. Accept in this case indicates a tenant suitability for a specific unit.
Figure 14B:
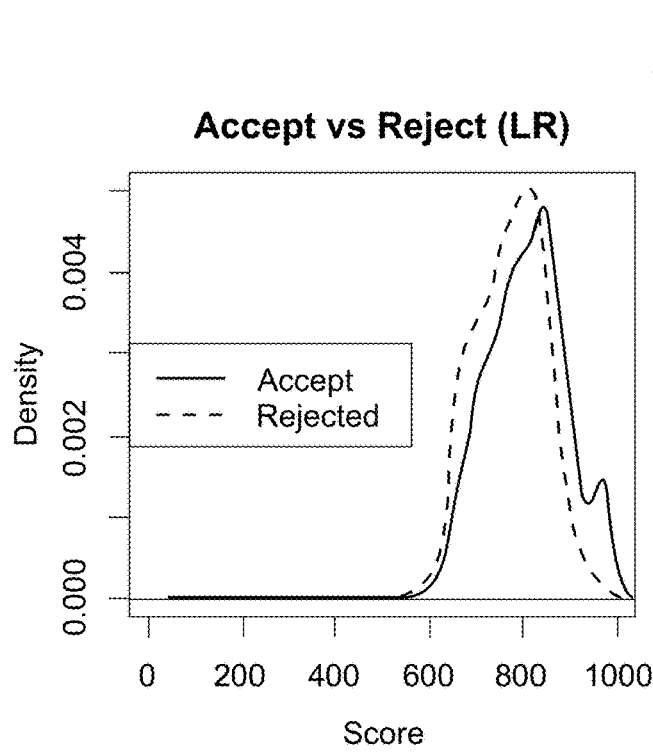
FIG. 14B illustrates a chart showing a density of scores for Accept and Reject populations using LR. Score is the survival score, transformed to [0, 1000]. The higher the score the less likely to default or leave before an acceptable length of stay (e.g. 12 months).

FIG. 14 shows a difference in score distribution for the Reject population and Accept population using RF, while in LR any differences are quite subtle except that the Accept population spikes twice with a smaller peak at the higher end of the score.

To continue with the samples population with a bad history, an additional feature was created and named 'History'. It is a binary variable which indicates those people who were rejected by landlord but still became a tenant. It is considered the most crucial condition by which the landlord rejects people, but during the model selection process, surprisingly this feature does not seem to possess any predictive power or significance. This may be explained by the temporary nature of cash flow poverty, when someone loses a job, relationship or other factors impact on income. Although the criminal records, credit history or eviction history of good tenants were not available for the analysis, it was appropriate to assume if any of those negative factors appeared then a good FICO score would not have been provided hence they would have been rejected immediately. This further proves that filtering out those individuals who have a bad history may not be a wise decision for creating a method for sorting good and bad prospective tenants. On the other hand, even with a small sample size indications that there are still potentially high risks involved in taking applicants with bad history as tenants. To be able to demonstrate that not all applicants with bad history should be rejected requires further analysis on a much larger scale.

The details of various data and properties are further described.

| Tenant data | | |
|---|---|---|
| Variables | Type of variable | Description |
| Tenant ID | Alphanumeric | Unique ID |
| Age | Numeric | Age of tenant (at entry) |
| FICO | Numeric | Credit score used in US (at entry) |
| Income monthly | Numeric | Monthly income at entry (USD) |
| Total Debt | Numeric | Total debt including medical debt |
| Scoreable Debt | Numeric | Debt used for credit score |
| Subsidy? | Binary | Whether or not the tenant receive subsidy |
| Rent Tenant Responsible For | Numeric | Rent payable by tenant (USD) |
| Portion of Rent Tenant Responsible | Percentage | Percentage of rent tenant should pay |
| Rent to Income Ratio | Percentage | Rent/income |
| Past Tenant | Binary | Is the tenant a past tenant or not |
| Total Write Offs | Numeric | Total prior write-offs |
| Eviction Filed | Binary | Eviction filed for tenant |
| Eviction Filed, Paid off Balance | Binary | Eviction filed and tenant paid off balance |
| Evicted? (Filed on, then Moved Out) | Binary | Eviction filed and tenant moved out |
| Tenant Default? | Binary | Tenant defaulted |
| Tenure at Job | Numeric | Number of days at current job |
| Tenure at Previous Residence | Numeric | Number of days at previous residence |
| Yardi Screening Decision | Categoric | Yardi screening software's decision (3 levels) |
| Primary Screening Issue | Categoric | Types of issues if primary screening (7 levels) |
| Unit Rent | Numeric | Rent for the unit |

| Field Name | Description | Type |
|---|---|---|
| FAMILYID | A 12 digit number assigned to uniquely identify this household (HH). | String |
| RECENCY_DATE | Month and year (yyyymm) of most recent confirmation of this HH at this address | Date |
| PRIMARY_FAMILY_IND | Indicates this record is considered to be the primary family at this address. | String |
| HOUSEHOLDSTATUS | Indicates whether the household qualifies for fulfillment via list rental or the general reason why it does not qualify. | String |
| HEAD_HH_AGE_CODE | Age of head of household | Numeric |
| LENGTH_OF_RESIDENCE | The difference (in months) between arrival date at a residence and current (system) date, converted to number of years. Range is limited to current year minus 1959. | Numeric |
| CHILDRENHHCOUNT | Number of HH members determined to be children | Numeric |
| WEALTH_FINDER_SCORE | Modeled predicition of household wealth | Numeric |

| Tenant data | | |
|---|---|---|
| FIND_DIV_1000 | FIND is a prediction of HH income. | Numeric |
| OWNER_RENTER_STATUS | indicates the HH either owns their home or is renting. | Binary |
| ESTMTD_HOME_VAL_DIV_1000 | Estimated home value. When more than one household (including non-fulfillment records) is at the same address (as defined by LocationID), the best home value is chosen and stored for all of them. | Numeric |
| MARITAL_STATUS | Score indicating likelihood Head of HH is married. | Binary |
| PPI_DIV_1000 | Estimate of relative purchasing power of a HH, derived by adjusting FIND with the appropriate cost of living index for the county in which the HH resides. | Numeric |
| LOCATIONID | 12 digit number that uniquely identifies (link together) a primary family and its associated subfamilies. | Numeric |
| HOUSE_NUM | Primary address number or "house number". Precedes street name and may contain alpha characters and/or a single hyphen. | String |
| STREET_NAME | Official name of a street as assigned by a local governing authority. | String |
| CITY | Post office, branch, community or locality name used for last line of a mailing label. May vary within zip code. Usually the "city" name | String |
| STATE | Standard state abbreviation | String |
| ZIP | Zip code | Numeric |
| VACANT | Indicates vacant. | Binary |
| BATHROOM_CNT | Number of bathrooms in dwelling unit. | Numeric |
| BEDROOM_CNT | Number of bedrooms in dwelling unit. | Numeric |
| BUILT_YEAR | Year (yyyy) dwelling built. | Numeric |
| BUILDING_AREA | Square footage of dwelling. | Numeric |
| ROOM_CNT | Number of rooms in dwelling unit. | Numeric |
| LATITUDE | Angular distance north or south from the equator of a point on the earth's surface, measured on the meridian of the point. | Numeric |
| LONGITUDE | Angular distance east or west on the earth's surface, measured by the angle contained between the meridian of a given point and a prime meridian. | Numeric |

| Property data | | |
|---|---|---|
| Variables | Type of variable | Description |
| HEAT PAID BY | Categoric | Heating bill paid by (3 levels) |
| ZONE | Categoric | Zone of the property is in (11 levels) |
| NEIGHBORHOOD | Categoric | Name of neighbourhood (64 levels) |
| UNITTYPE | Categoric | Type of the property (3 levels) |
| UNIT AREA | Numeric | Area in square feet |
| BEDROOMS | Numeric | Number of bedrooms in the property |
| BATHS | Numeric | Number of bathrooms in the property |
| CITY | Categoric | City of the property is in (18 levels) |
| State | Categoric | State of the property is in (4 levels) |
| TOTAL AREA | Numeric | Area of the property |
| TARGET RENT | Numeric | The targeted rent the property should have |
| CURRENT RENT | Numeric | The current rent tenant is paying for this property |
| Min Rent | Numeric | Minimum rent this property should have |
| Max Rent | Numeric | Maximum rent this property should have |
| Market Clustering | Numeric | Unknown |
| Count Vacant Units | Numeric | Empty units within the property at the time |

| Full table used in Feature Selection | | | | |
|---|---|---|---|---|
| Features | RF importance | GM rel.inf | RF rank | GB rank |
| Past.Tenant | 0.02566998 | 51.18467472 | 1 | 1 |
| log Rent.Tenant.ResponsibleEor | 0.016424673 | 8.539880454 | 2 | 3 |
| FICO | 0.015431834 | 27.1420707 | 3 | 2 |
| HEAT PAID BY | 0.014633646 | 7.333793158 | 4 | 4 |
| log Unit.Rent | 0.010497739 | 0 | 5 | 15 |

-continued

Full table used in Feature Selection

| Features | RF importance | GM rel.inf | RF rank | GB rank |
|---|---|---|---|---|
| TOTAL AREA | 0.008788586 | 0.090223802 | 6 | 9 |
| BEDROOMS | 0.008011161 | 0.764918701 | 7 | 6 |
| Rent.to.Income.Ratio | 0.007439746 | 0.13259033 | 8 | 7 |
| Subsidy. | 0.00695741 | 0.87168667 | 9 | 5 |
| Income.monthly | 0.006928706 | 0 | 10 | 16 |
| Tenure.at.Job | 0.004415183 | 0.096437416 | 11 | 8 |
| Total.Debt | 0.003781738 | 0 | 12 | 12 |
| UNITTYPE | 0.003628435 | 0 | 13 | 11 |
| Scoreable.Debt | 0.002092573 | 0 | 14 | 13 |
| Tenure.at.Previous.Residence | 0.001957317 | 0.038976148 | 15 | 10 |
| Portion.of.Rent.Tenant.Responsible | 0.00176758 | 0 | 16 | 14 |
| BATHROOMS | 0.00036082 | 0 | 17 | 18 |
| BUILDING STATUS | 0.000239596 | 0 | 18 | 17 |
| internet | 0.000124863 | 0 | 19 | 19 |
| fitness | 0.000021457 | 0 | 20 | 20 |

Further graphs are shown in FIGS. 15-17. FIG. 15 illustrates cut-off analysis graphs of the 4 models. FIG. 16 illustrates the distribution of the scores of one particular testing set. Note that GB has trimodal distribution which is different to the other three. FIG. 17 illustrates Kaplan-Meier survival probabilities for different categorical variables in the data.

Figure 18:
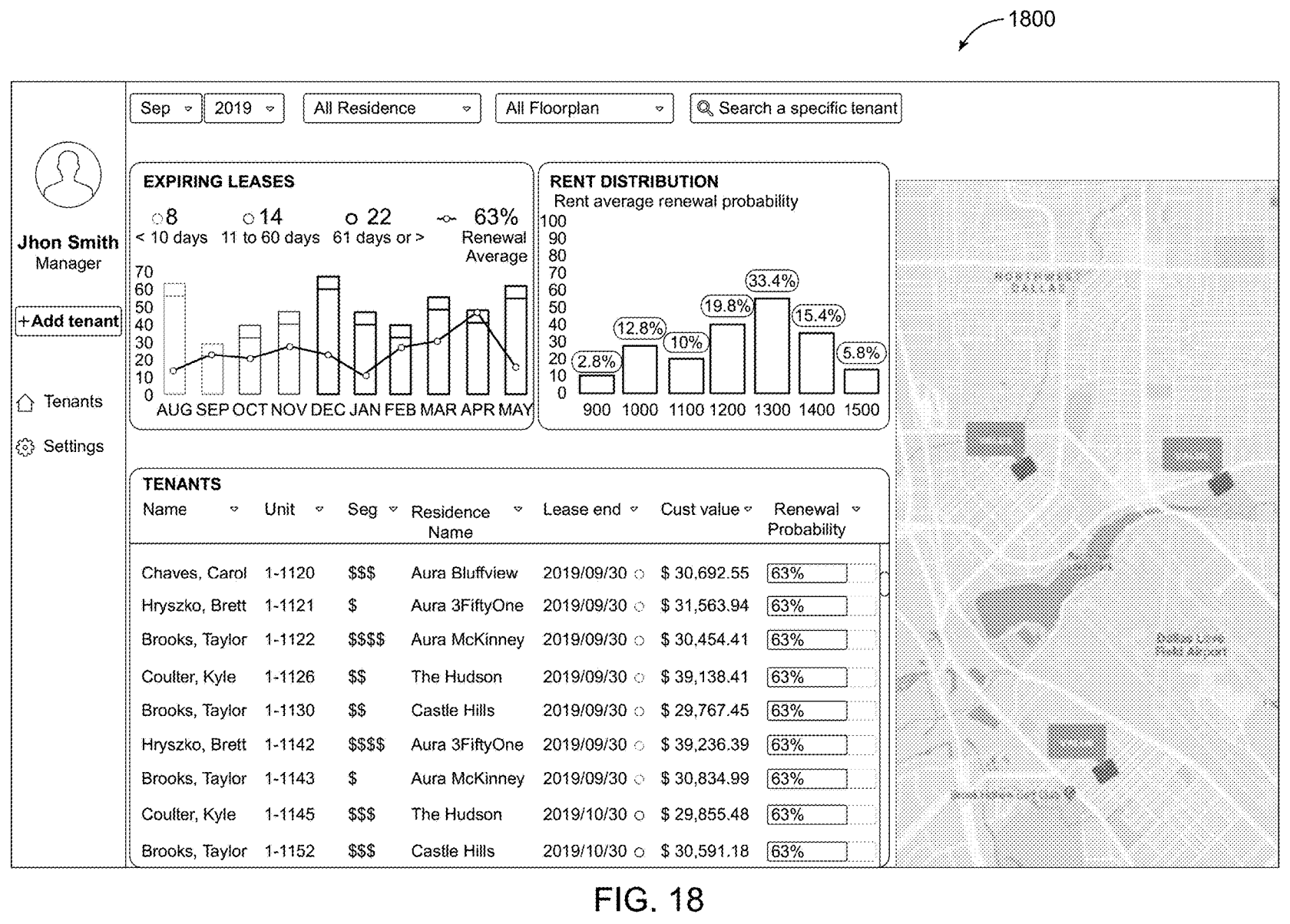

FIG. 18 illustrates an example system 1800 according to various embodiments described in the present disclosure. In some examples, the system 1800 predicts expected renewal probability of a tenant based on third party data (demographic, crime, neighborhood) as well as tenant attributes (income, wealth, age) and property attributes (number of bedrooms, value, apartment or home). As shown in a dashboard of the system 1800 of an example system, an accurate model based on back testing can be leveraged to perform the following analysis by investors. For example, the system may segment customers into discrete groups (low value represented by a single S or highest value based on SSSS) and treat groups differently via customer service. The system may also include revenue management, which is configured to optimise tenant retention based on customer behavior or propensity versus only type of apartment and hot or cool market conditions. The system 1800 may also include prospecting which, based on current customers, is configured to acquire similar customers or "lookalike audiences" through third party lead sources or online channels used for acquiring leads. The system 1800 may also include planning that comprises a view of retention based on prior tenants as well as current tenant attributes.

Various embodiments in FIGS. 1-18 provide advantages over existing tenant screening applications. For example, the system (e.g., 100 in FIG. 1) uses additional factors other than tenant credit and income in predicting suitability for selection of tenant and their "ability to pay" and "willingness to pay." These additional factors include neighborhood specific or property specific information which are important for tenant's "ability or willingness to stay." In addition, alternate data about tenant (e.g. online activity on social networking sites like Twitter, Facebook, Linkedin), or prior tenancy durations in earlier properties they stayed in are also used. The system in the present disclosure also allows a landlord, owner or lender to ascertain apriori, the expected duration of stay for a specific tenant in an apartment, single family home, condo, or similar dwelling. This is useful for (a) better screening of tenants based on total profitability to landlord (b) ability to correlate length of stay score to other macroeconomic variables in the economy and predict risk to portfolios of properties and also to portfolios of loans by lenders.

Figure 19:
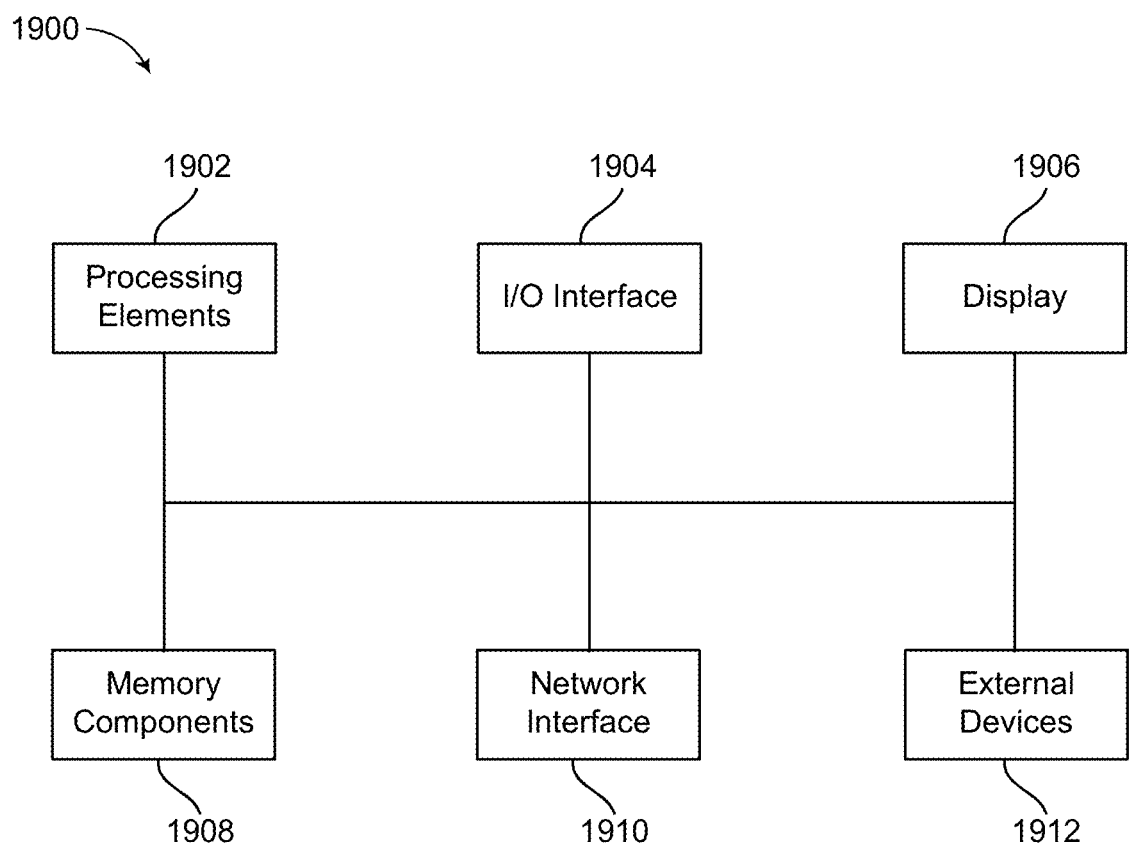
FIG. 19 is an example block diagram of a computing device that can be used to implement various systems and methods described herein.

FIG. 19 shows a simplified block structure for a computing device that may be used with the system 100 (in FIG. 1) or integrated into one or more components of the system. For example, the length of stay prediction unit 104, the data processing & validation unit 106, validation system of compliance 114, the rental unit allocation portal 108, the portfolio risk allocation system 116, and the property listing rental portal 120 may include one or more of the components shown in FIG. 19 and be used to implement one or blocks or execute one or more of the operations disclosed in FIGS. 2-18. In FIG. 19, the computing device 1900 may include one or more processing elements 1902, an input/output interface 1904, a display 1906, one or more memory components 1908, a network interface 1910, and one or more external devices 1912. Each of the various components may be in communication with one another through one or more busses, wireless means, or the like.

The processing element 1902 may be any type of electronic device capable of processing, receiving, and/or transmitting instructions. For example, the processing element 1902 may be a central processing unit, microprocessor, processor, or microcontroller. Additionally, it should be noted that some components of the computer 1900 may be controlled by a first processor and other components may be controlled by a second processor, where the first and second processors may or may not be in communication with each other.

The memory components 1908 are used by the computer 1900 to store instructions for the processing element 1902, as well as store data, such as the fluid device data, historical data, and the like. The memory components 1908 may be, for example, magneto-optical storage, read-only memory, random access memory, erasable programmable memory, flash memory, or a combination of one or more types of memory components.

The display 1906 provides visual feedback to a user and, optionally, can act as an input element to enable a user to control, manipulate, and calibrate various components of the computing device 1900. The display 1906 may be a liquid crystal display, plasma display, organic light-emitting diode display, and/or cathode ray tube display. In embodiments where the display 1906 is used as an input, the display may include one or more touch or input sensors, such as capacitive touch sensors, resistive grid, or the like.

The I/O interface 1904 allows a user to enter data into the computer 1900, as well as provides an input/output for the computer 1900 to communicate with other devices or services (e.g., services 104 in FIG. 1, other computers, speakers, etc.). The I/O interface 1904 can include one or more input buttons, touch pads, and so on.

The network interface 1910 provides communication to and from the computer 1900 to other devices. For example, the network interface 1910 allows the rental unit allocation portal 108 to communicate with the length of stay prediction unit 104 or one or more systems, such as 106, 114, 106, 120, or one or more databases, such as 108, 110, 112 through the communication network 102 (in FIG. 1). The network interface 1910 includes one or more communication protocols, such as, but not limited to WiFi, Ethernet, Bluetooth, and so on. The network interface 1910 may also include one or more hardwired components, such as a Universal Serial Bus (USB) cable, or the like. The configuration of the network interface 1910 depends on the types of communication desired and may be modified to communicate via WiFi, Bluetooth, and so on.

The external devices 1912 are one or more devices that can be used to provide various inputs to the computing device 1900, e.g., mouse, microphone, keyboard, trackpad, or the like. The external devices 1912 may be local or remote and may vary as desired.

Alternatively, and/or additionally, the one or more models described in this document may be used to predict a tenant's propensity to move. For example, a model is trained on the same data, however, rather than predicting an eviction field, based on the empirical eviction rate of tenants, data may be trained directly on a tenant's length of tenure. In obtaining the model, there may be various ways. For example, past rental data may be used to tailor a model specifically to the types of properties a user (e.g., rental property management) owns. Alternatively, and/or additionally, proprietary datasets involving tenant survey data may be used to train the model.

The length of stay model trained on the generic survey data may not be as good as what can be achieved using the past rental data from the user's own data. However, in some scenarios, training a model with proprietary dataset may have the advantage that it is general enough to give an indication of the propensity of moving of a population in an area. Hence, a model obtained using such proprietary dataset may be used to create a "length of stay" index, which can give users new to a neighbourhood an idea of the behaviour of renters in that neighbourhood. This index can be published for a variety of locations, and going back in time a number of years (depending on the availability of the survey data). In some examples, suitable features included in the model discussed above may be used to break down the index further. For example, the system may create a length of stay index specifically for families with two kids, or 20-30 year old couples, or people earning over 100 k annually.

The various embodiments described herein provide advantages over existing systems. Further, owners of pools of apartment properties (REITs) and lenders to loans secured by apartment properties, would benefit from understanding the risk to income in underlying portfolios by assessing remaining duration of leases on these portfolios, and using such risk scores to underwrite new or existing loans.

The foregoing description has a broad application. For example, while examples disclosed herein may focus on a property rental system, it should be appreciated that the concepts disclosed herein may equally apply to other rental systems such as storage rental, store rental, commercial building rental, or other rental systems. Further, it is appreciated that variations of the embodiments disclosed herein may be possible. For example, boxes 166, 168, 170, 172 in FIG. 1B may be implemented in separate normalisers, or in a single normalizer. In another variation, a single normalisation process and the vote process 174 (in FIG. 1B) may be implemented in a single processing device. In that case, a single normalised state may result. Accordingly, the disclosure is meant only to provide examples of various systems and methods and is not intended to suggest that the scope of the disclosure, including the claims, is limited to these examples.

As used in this document, the singular forms "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Unless defined otherwise, all technical and scientific terms used in this document have the same meanings as commonly understood by one of ordinary skill in the art.

Reference throughout this specification to features, advantages, or similar language does not imply that all of the features and advantages that may be realized with the present solution should be or are in any single embodiment thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages, and characteristics of the present solution may be combined in any suitable manner in one or more embodiments. One ordinarily skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Other advantages can be apparent to those skilled in the art from the foregoing specification. Accordingly, it will be recognized by those skilled in the art that changes, modifications, or combinations may be made to the above-described embodiments without departing from the broad inventive concepts of the invention. It should therefore be understood that the present solution is not limited to the particular embodiments described herein, but is intended to include all changes, modifications, and all combinations of various embodiments that are within the scope and spirit of the invention as defined in the claims.

We claim:
1. A system comprising:
a rental unit allocation portal configured to:
receive tenant application information associated with a tenant,
receive neighborhood data for a neighborhood in which a rental unit is located,
receive additional data including at least one of property data, spatial or property specific reasons, tenant credit information, social or online tenant activity, or prior rental history of the tenant, train one or more machine learning models with the tenant application information, the neighborhood data, and the additional data to determine a length of stay prediction score, and allocate a rental unit based on the length of stay prediction score; and a prediction unit communicatively coupled to the rental unit allocation portal and configured to:
receive the tenant application information from the rental unit allocation portal;
receive the neighborhood data;
receive the additional data;
determine the length of stay prediction score based on the tenant information, the neighborhood data, and the additional data by using the one or more machine learning models, wherein each of the one or more machine learning models is selected from a group consisting of a logic regression model, a survival analysis model, a tree-based model and a gradient boosting model, wherein the rental unit allocation portal is further configured to output the length of stay prediction score to a user.

2. The system of claim 1, wherein the prediction unit is configured to determine the length of stay prediction score by using multiple models by:
determining a respective prediction score for each of the multiple models; and
voting the prediction scores based on output from one or more of the multiple models.

3. The system of claim 2, wherein the prediction unit is further configured to determine an accuracy of the one or more of the multiple models by using a conformal predictor to determine a predictive interval.

4. The system of claim 2, wherein the prediction unit is configured to determine that the tenant has a likelihood of going into default during a tenancy period if each respective prediction score for each of the multiple models indicates that the tenant has a likelihood of going into default during the tenancy period or understay a predicted tenancy duration.

5. The system of claim 2 further comprising a risk allocation system configured to determine a risk for a portfolio of underlying properties with tenants or a portfolio of loans secured by tenanted properties based on the length of stay prediction score.

6. The system of claim 5, wherein the respective prediction score for each of the multiple models is further determined based on the risk for the portfolio of underlying properties with tenants or the portfolio of loans secured by tenanted properties.

7. A method comprising:
at a rental unit allocation portal:
receiving tenant application information associated with a tenant;
receiving neighborhood data for a neighborhood in which a rental unit is located,
receiving additional data including at least one of property data, spatial or property specific reasons, tenant credit information, social or online tenant activity, or prior rental history of the tenant,
training one or more machine learning models with the tenant application information, the neighborhood data, and the additional data to determine a length of stay prediction score;
allocating a rental unit based on the length of stay prediction score;

at a prediction unit communicatively coupled to the rental unit allocation portal:
receiving the additional data; and
determining the length of stay prediction score based on the tenant information the neighborhood data, and the additional data by using the one or more machine learning models, each of the one or more machine learning models is selected from a group consisting of a logic regression model, a survival analysis model, a tree-based model and a gradient boosting model; and
outputting the length of stay prediction score to a user from the rental unit allocation portal.

8. The method of claim 7, wherein determining the length of stay prediction score comprises:
determining a respective prediction score for each of the multiple models; and
voting the prediction scores based on output from one or more of the multiple models.

9. The method of claim 8, wherein determining the respective prediction score further comprises determining an accuracy of corresponding model by using a conformal predictor to determine a predictive interval.

10. The method of claim 8 further comprising determining that the tenant has a likelihood of going into default during a tenancy period if each respective prediction score for each of the multiple models indicates that the tenant has a likelihood of going into default during the tenancy period or understay a predicted tenancy duration.

11. The method of claim 8 further comprising determining a risk for a portfolio of underlying properties with tenants or a portfolio of loans secured by tenanted properties based on the length of stay prediction score.

12. The method of claim 11, wherein the respective prediction score for each of the multiple models is further determined based on the risk for the portfolio of underlying properties with tenants or the portfolio of loans secured by tenanted properties.

13. One or more computer-readable non-transitory storage media, the media encoded with instructions for performing operations comprising:
receiving tenant application information associated with a tenant;
receiving neighborhood data for a neighborhood in which a rental unit is located;
receiving additional data including at least one of property data, spatial or property specific reasons, tenant credit information, social or online tenant activity, or prior rental history of the tenant;
training one or more machine learning models with the tenant application information, the neighborhood data, and the additional data to determine a length of stay prediction score;
determining the length of stay prediction score based on the tenant information, the neighborhood data, and the additional data by using the one or more machine learning models, each of the one or more machine learning models is selected from a group consisting of a logic regression model, a survival analysis model, a tree-based model and a gradient boosting model; and
allocating a rental unit based on a length of stay prediction score; and
outputting the length of stay prediction score to a user via the rental unit allocation portal.

14. The media of claim 13, wherein determining the length of stay prediction score comprises:
   determining a respective prediction score for each of the multiple models; and
   voting the prediction scores based on output from one or more of the multiple models.

15. The media of claim 14, wherein determining the respective prediction score further comprises determining an accuracy of corresponding model by using a conformal predictor to determine a predictive interval.

16. The media of claim 14, wherein the operations further comprise determining that the tenant has a likelihood of going into default during a tenancy period if each respective prediction score for each of the multiple models indicates that the tenant has a likelihood of going into default during the tenancy period or understay a predicted tenancy duration.

17. The media of claim 14, wherein the operations further comprise determining a risk for a portfolio of underlying properties with tenants or a portfolio of loans secured by tenanted properties based on the length of stay prediction score.

18. The media of claim 17, wherein the respective prediction score for each of the multiple models is further determined based on the risk for the portfolio of underlying properties with tenants or the portfolio of loans secured by tenanted properties.

19. The media of claim 13, wherein the neighborhood data includes at least one of a desirability of the rental unit, a location of the rental unit, school data, crime rate data, or median income data.

20. The media of claim 13, wherein determining the length of stay prediction score comprises:
   determining a respective prediction score for each of the multiple models;
   determining normalized prediction scores from the prediction scores for each of the multiple models;
   determining an average length of stay prediction score based on the normalized prediction scores.

* * * * *